United States Patent [19]

Leonard

[11] Patent Number: 5,143,328
[45] Date of Patent: * Sep. 1, 1992

[54] LAUNCH VEHICLE WITH RECONFIGURABLE INTERSTAGE PROPELLANT MANIFOLDING AND SOLID ROCKET BOOSTERS

[76] Inventor: Byron P. Leonard, 13700 Tahiti Way, Marina Del Rey, Calif. 90292

[ * ] Notice: The portion of the term of this patent subsequent to Aug. 25, 2009 has been disclaimed.

[21] Appl. No.: 472,096

[22] Filed: Jan. 30, 1990

Related U.S. Application Data

[63] Continuation-in-part of Ser. No. 417,278, Oct. 5, 1989, Pat. No. 5,129,602, and Ser. No. 417,736, Oct. 5, 1989, Pat. No. 5,141,181.

[51] Int. Cl.$^5$ .......................... B64G 1/00; B64G 1/40
[52] U.S. Cl. .................... 244/158 R; 244/172
[58] Field of Search ................ 244/158 R, 160, 172

[56] References Cited

U.S. PATENT DOCUMENTS

| | | | |
|---|---|---|---|
| 2,755,046 | 7/1956 | Underwood, Jr. | 244/135 C |
| 3,369,771 | 2/1968 | Walley et al. | 244/158 R |
| 3,782,400 | 1/1974 | Hardison et al. | 137/39 |
| 3,934,512 | 1/1976 | Adachi | 102/377 |
| 3,977,633 | 8/1976 | Keigler et al. | 244/169 |
| 4,012,012 | 3/1977 | Ligler | 244/1 R |
| 4,104,878 | 8/1978 | Chase | 60/245 |
| 4,451,017 | 5/1984 | Marshall | 244/2 |
| 4,505,124 | 3/1985 | Mayer | 62/180 |
| 4,591,115 | 5/1986 | DeCarlo | 244/135 C |
| 4,609,169 | 9/1986 | Schweickert et al. | 244/169 |
| 4,723,736 | 2/1988 | Rider | 244/172 |
| 4,796,839 | 1/1989 | Davis | 244/160 |
| 4,807,833 | 2/1989 | Pori | 244/158 R |
| 4,834,324 | 5/1989 | Criswell | 244/160 |

FOREIGN PATENT DOCUMENTS 2623774 6/1989 France .

OTHER PUBLICATIONS

Flight Performance Handbook for Powered flight Operations (Revised 1963) Ed. J. Frederick White, pp. 5-80 through 5-85.
"Predicting Launch Vehicle Failure" *Aerospace America*, Sep. 1989, pp. 36–46.
Titan Background Literature.
Delta Background Literature.
Atlas Background Literature.

*Primary Examiner*—Sherman D. Basinger
*Assistant Examiner*—Anne E. Bidwell
*Attorney, Agent, or Firm*—Spensley Horn Jubas & Lubitz

[57] ABSTRACT

A launch vehicle having one or more high thrust solid propellant boosters and two or more liquid propellant stages all configured to burn in parallel and having an interstage propellant manifolding system between the parallel liquid burning stages. Preferably, existing U.S. launch vehicle stages may be employed as the parallel burning stages. An additional liquid stage burning in series with the lower stages may also be employed. The interstage propellant manifolding between the liquid burning stages allows the central vehicle core to be stabilized against high altitude wind loads and further provides increased performance to the launch vehicle. Additionally, the interstage propellant transfer manifold is equipped with a plurality of electromechanical valves to allow reconfiguration of the propellant flow in real time in the event of a stage failure, thereby providing significantly increased vehicle reliability.

28 Claims, 10 Drawing Sheets

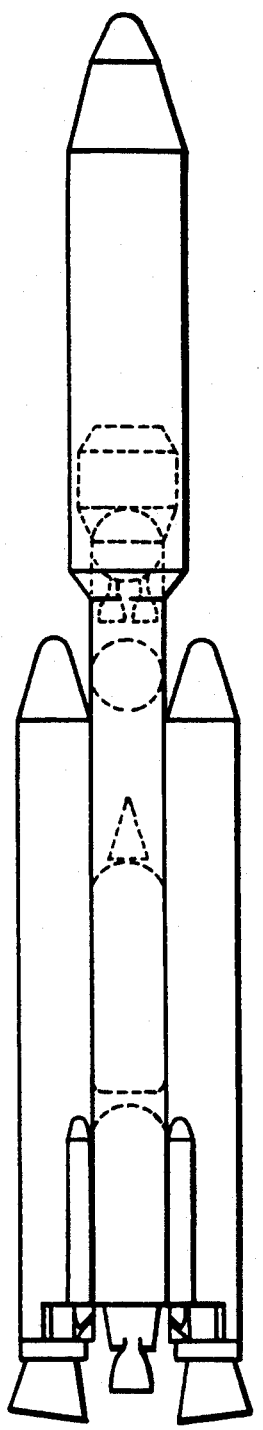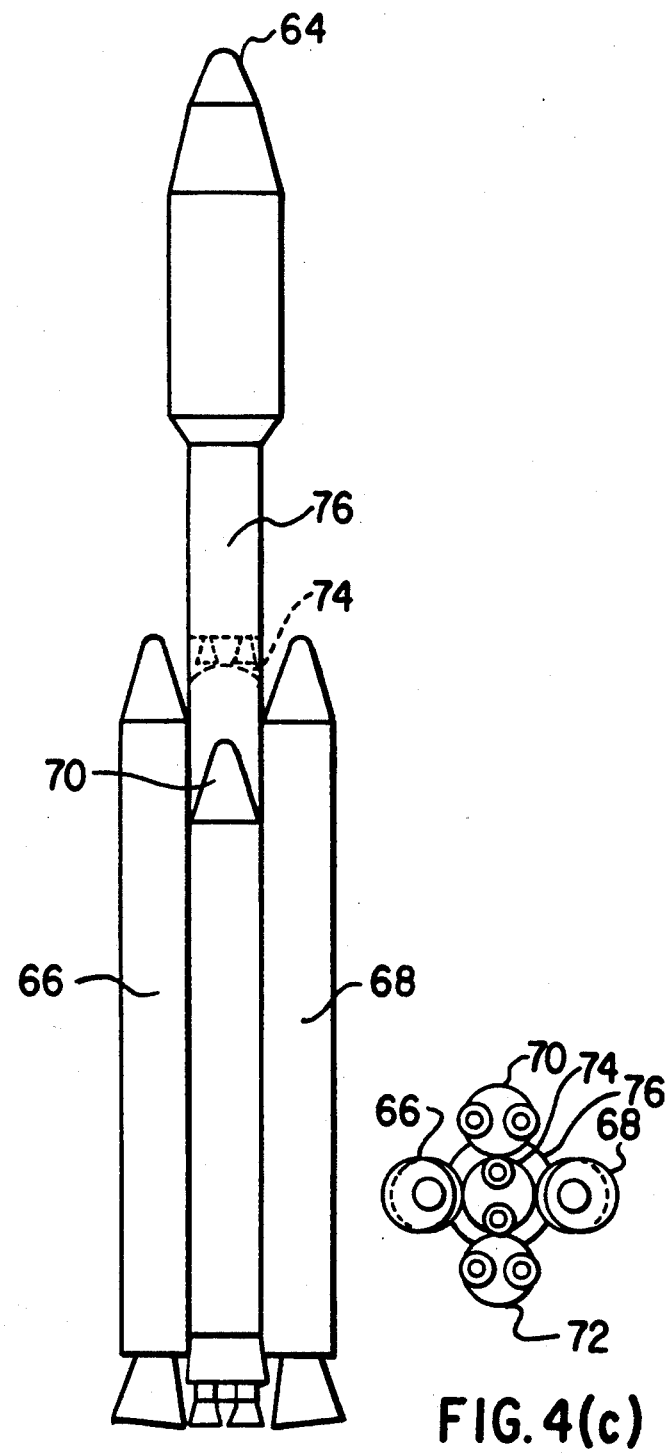
FIG. 4(a)
(PRIOR ART)
FIG. 4(b)
FIG. 4(c)

LAUNCH VEHICLE WITH RECONFIGURABLE INTERSTAGE PROPELLANT MANIFOLDING AND SOLID ROCKET BOOSTERS

CROSS REFERENCE TO RELATED APPLICATIONS

This application is a continuation-in-part of (1) application Ser. No. 07/417,278 filed Oct. 5, 1989, for "MULTISTAGE LAUNCH VEHICLE EMPLOYING INTERSTAGE PROPELLANT AND REDUNDANT STAGING" issued Jul. 14, 1992 as U.S. Pat. No. 5,129,602; and (2) application Ser. No. 07/417,736 filed Oct. 5, 1989, for "IMPROVED LAUNCH VEHICLE WITH INTERSTAGE PROPELLANT MANIFOLDING" issued Aug. 25, 1992 as U.S. Pat. No. 5,141,181.

BACKGROUND OF THE INVENTION

1. Field of the Invention

The present invention relates to multi-stage launch vehicles. In particular, the present invention relates to relatively high performance, high reliability launch vehicles for placing payloads into earth orbit and beyond, i.e., escape from the gravity of Earth.

2. Description of Prior Art and Related Information

The various approaches to launch vehicle design may be generally classified into single stage or multistage launch vehicle systems. Single stage launch vehicles employ a single thruster stage which includes all the propellant required to deliver a specified velocity to the payload. Since considerable mass is contained in the propellant tanks, engines and thrust structure, which mass becomes unnecessary once propellant therein is expended, a single stage launch vehicle is inherently of less than optimum efficiency. Multi-stage launch vehicles, where an entire stage, including propellant tanks and engines, is jettisoned after propellant expenditure, have accordingly been developed and gained predominance for earth orbit launch applications. The Titan is a vehicle having those characteristics.

The Titan was originally designed as a two-stage, liquid rocket ICBM (Intercontinental Ballistic Missile). The velocity requirements for ICBMs are substantially lower than the velocities required to place a payload into Earth Orbit. To achieve increased capabilities for this launch vehicle, updating of engine thrusts and lengthening of the stage(s) to accommodate increases in propellant have been employed. Additionally, for very large payloads, two solid rocket strap-on stages are added to the liquid rocket stages. Substantial further increases in performances of the Titan are inhibited, however, by the difficulties associated with achieving further increases in engine liquid rocket thrusts and increased stage lengths. In particular, the stage length problem is severe since the ratio of the overall length to diameter of a launch vehicle is critical to its stiffness, which in turn, is critical to the dynamic loads it can withstand due to high altitude winds that it encounters as it traverses the Earth's atmosphere. Also, the wind loads increase as the length of the vehicle increases. Similar problems are also presented with providing increased payload to Earth Orbit capabilities for the other expendable U.S. launch vehicles, the Atlas and Delta launch vehicles, since these were also originally designed as ICBMs or IRBMs (Intermediate Range Ballistic Missiles).

These difficulties in providing further upgrades in capability may be appreciated by consideration of one specific upgraded Titan launch vehicle, the Titan IV. This upgraded Titan is one of three current unmanned expendable U.S. Space Launch Vehicles. The others are the Atlas II and Delta II. A Titan IV configuration is shown in FIG. 1.

The Titan IV can be flown as a three or four stage launch vehicle for space missions in Low Earth Orbit (LEO) and High Energy Orbits (HEO), i.e., Geosynchronous Orbits (GEO). The first stage consists of two uprated solid rocket motors (SRMU) boosters 1 and 2 "strapped-on" to the second and third liquid propellant stages, 3 and 4. The three stages operate in series, i.e. the thrust of each stage is initiated after previous thrusting stages have expended their propellants and been staged. The total thrusts delivered by the SRMU boosters 1 and 2 at liftoff is approximately 2.8 million lbf. For GEO missions, the fourth stage 5 is a modified Centaur stage propelled by two $LO_2/LH_2$ cryogenic engines. The four stage vehicle has a performance of approximately 12,000 lbs to GEO. The Titan IV liquid core stages 3 and 4 have been uprated in performance by increasing engine thrusts and stage lengths to accommodate more propellant while maintaining their original ten foot diameters. The length to diameter ratio of a launch vehicle is critical to its stiffness, which in turn is critical to the dynamic loads it can withstand due to high altitude winds it encounters as it traverses the Earth's atmosphere. The wind loads must be limited both to protect the structural integrity of the vehicle and to maintain its control authority by means of the engines thrusting at varying gimbal angles to maintain the proper vehicle attitude. Small increases in performance have been achieved by employing load alleviating flight trajectories which reduce the wind loads. Although stiffening the Titan liquid core (stages) is a possibility, the design changes required to achieve a substantial improvement would be extensive. Thus, it is clear that large performance increases will not be achieved without substantial increases in the stiffness of the liquid stages 3 and 4 and increases in engine thrust either by new engine developments or increasing the numbers of existing engines in the vehicle.

Titan IV performance could be improved by igniting the liquid second stage 3 at liftoff, thus providing a first and second stage parallel burn from lift off. However, this would require an increase in the second stage 3 length to accommodate the propellant burned during first burn. This would exacerbate the core stages length to diameter ratio problem. Also, in addition to performance limitations, all of the engines in Titan IV (and Atlas II and Delta II) must function properly to achieve a successful launch. As a result, most Titan IV launch vehicle failures, as well as Atlas II and Delta II failures, are due to one of the engine's failing to thrust. This problem cannot be dealt with by adopting an engine-out strategy because none of these vehicles have a sufficient number of engines to meet their mission performance requirements when an engine fails (engine-out capability).

Accordingly, there presently exists a need to improve the performance, reliability and cost effectiveness of one or more of the current U.S. expendable launch vehicles.

SUMMARY OF THE INVENTION

The present invention provides a launch vehicle with higher performance and reliability than current expendable U.S. launch vehicles while utilizing modified versions of such launch vehicles.

The present invention provides an improved launch vehicle having a central launch vehicle stack with upper and lower stages, configured to burn in series, and additional stages configured in a side-by-side relationship with the core stage(s) and which burn in parallel with the core stage(s). These additional parallel stages include one or more high thrust, rapid burn, solid stages and one or more additional liquid stages. These liquid stages have lengths comparible to the stage(s) of the central vehicle stack. Interstage propellant manifolding between the parallel burn liquid stages is provided which permits all engines in the parallel liquid stages to utilize propellants from the tanks of the shorter burning stages. This reduces the amount of propellant required in the longer burning central stage. This has the effect of reducing the length, and weight of the longer burning stage thus increasing the structural stiffness and performance of the launch vehicle for a given amount of total thrust. The present invention further provides for reconfiguration of the launch vehicle in real time to accommodate launch vehicle non-catastrophic failures. In a preferred embodiment, the interstage propellant manifold has a number of electromechanical valves which allow the stages to function together during a launch in a flexible manner depending upon whether and what kind of failure the vehicle experiences during the launch. The functioning of the stages and the launch vehicle flight trajectory may thus be changed in flight, automatically or under the control of a ground crew, to enable the vehicle to reach Earth orbit in spite of the failure.

The launch vehicle of the present invention, incorporating the above noted features, may provide upgraded versions of existing launch vehicles, such upgraded launch vehicles having both improved payload performance and reliability.

In the improved launch vehicle of the present invention, modified versions of currently used U.S. launch vehicles are combined together in a parallel burn configuration by use of the interstage manifold approach of the present invention. This allows the present launch vehicle to have at least two liquid stages attached to each other at the time that the vehicle traverses the altitudes where high altitude winds can be a problem. The two attached stages provide a vehicle stiffness which is not available to current U.S. launch vehicles which have only one stage operating at those altitudes. Thus, the present invention provides a launch vehicle which breaks through the upper stage length barrier encountered by current U.S. launch vehicles due to high altitude winds.

The present invention further provides a larger, higher performance vehicle, than existing U.S. expendable launch vehicles. The present invention employs multiple liquid stages burning in parallel with high thrust solid boosters, with all stages thrusting at lift off. Performance is further enhanced by the interstage manifold which enables all parallel liquid stage propulsion systems to burn propellant only from the tanks of the lowest stage participating in that burn. This reduces the propellant carried in upper stages, thus, increasing the performance of the vehicle.

The present invention further provides an improved launch vehicle having increased reliability over existing expendable U.S. launch vehicles. Due to high vehicle cost and high payload value, the reliability of a launch vehicle is as essential as its payload performance. Indeed a launch vehicle is considered infeasible if it does not meet some minimum standard for reliability. The addition of stages, particularly propulsion systems, to a launch vehicle generally reduces the reliability of the vehicle. The launch vehicle of the present invention actually reverses this trend. Current U.S. launch vehicles, for example, will fail to achieve mission success if an engine fails to thrust or a stage fails to function. The present invention employing interstage manifolding enables multiple liquid stages burning in parallel to provide sufficient vehicle performance that mission success can be achieved in spite of the fact than an engine or a stage fails non-catastrophically. These failures are probalistic, i.e. the specific failure and its time of occurrence can not be predicted. However, by means of failure sensing and propellant management, the vehicle can be reconfigured, in real time, to accommodate non-catastrophic failures and still meet mission requirements. The end result is a launch vehicle using modified versions of existing stages, with higher performance and reliabilities than current U.S. launch vehicles.

BRIEF DESCRIPTION OF THE DRAWINGS

FIG. 4(a) is a side view of a prior art Titan IV type launch vehicle.

FIGS. 4(b) and 4(c) are a side and a top view, respectively, of an alternate embodiment of the improved launch vehicle of the present invention.

DETAILED DESCRIPTION OF THE INVENTION

Figure 1:
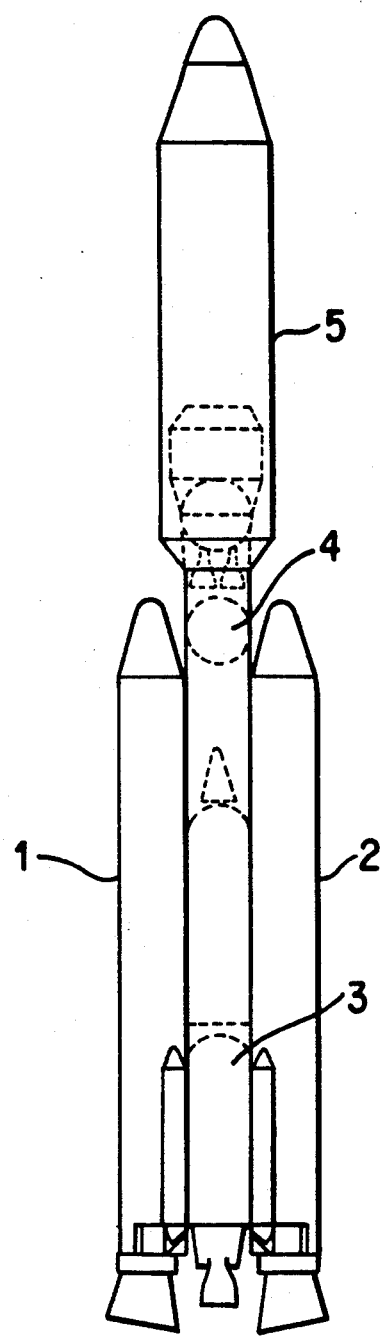
FIG. 1 is a side view of a prior art Titan IV type launch vehicle.
Figure 2A:
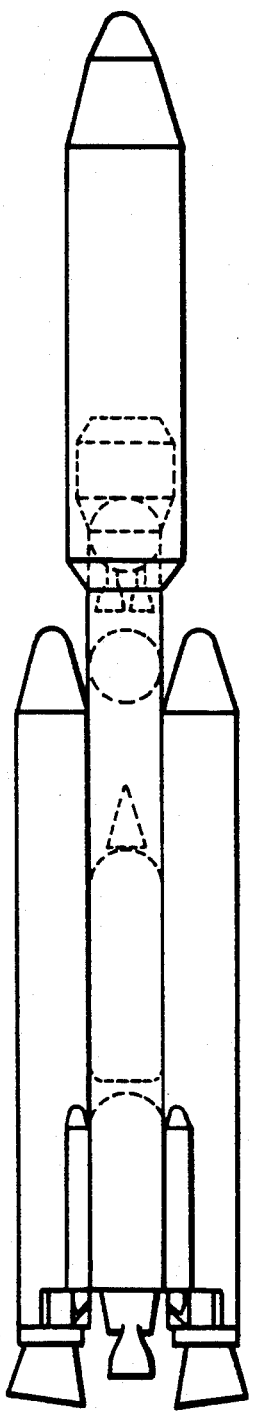
FIG. 2(a) is a side view of a prior art Titan IV type launch vehicle.
Figure 2B:
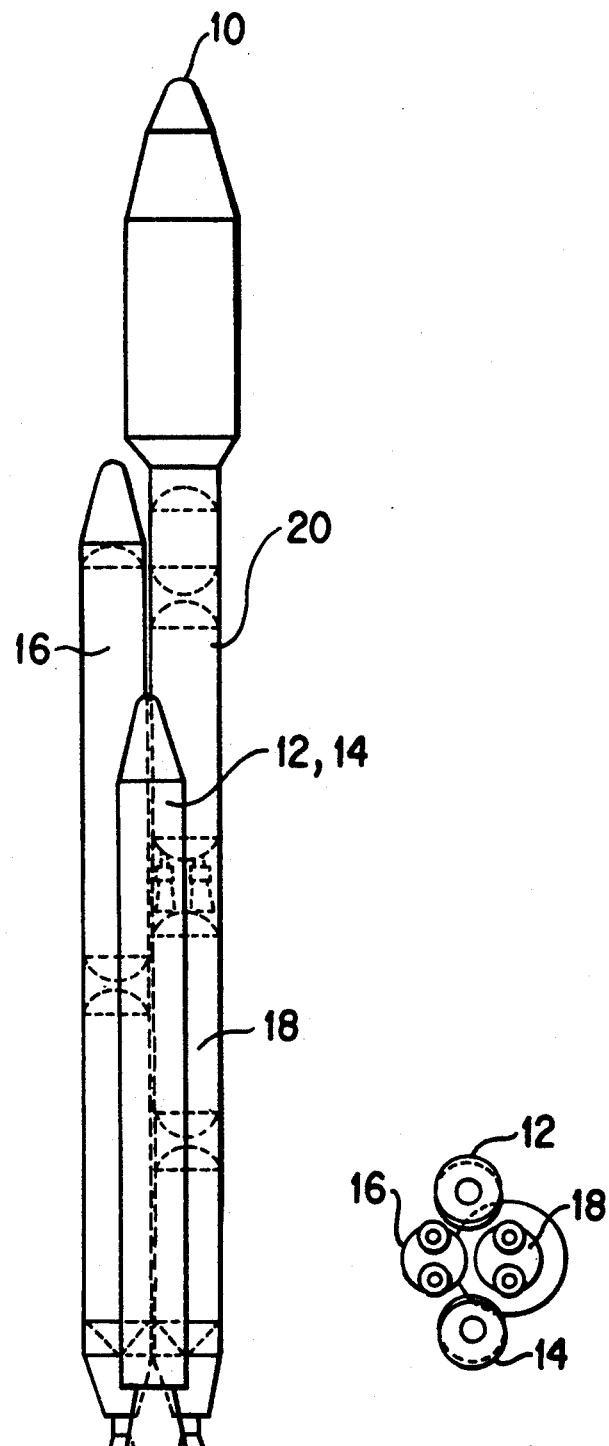
FIG. 2(b) is a side view of an improved launch vehicle in accordance with the present invention.
Figure 2C:
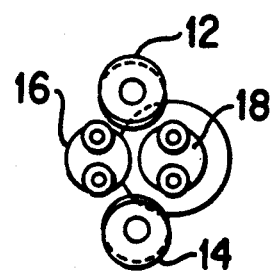
FIG. 2(c) is a top view of the improved launch vehicle of FIG. 2(b).

FIGS. 2(b) and 2(c) illustrate an improved launch vehicle 10 in accordance with the present invention in side and top views, respectively. For illustrative purposes, launch vehicle 10 is shown based on a Titan IV type launch vehicle. A conventional Titan IV having a Centaur upper stage is shown in FIG. 2(a) for comparison. However, it will be appreciated that the improved launch vehicle design may be employed with other existing designs for launch vehicle stages or with new vehicle stages.

Launch vehicle 10, as illustrated in FIGS. 2(b) and 2(c), is a four stage vehicle. As used herein, the term "stage" refers to the structural portion or portions of the launch vehicle which are staged, i.e. jettisoned, simultaneously for a nominal launch. The launch vehicle 10 utilizes two Solid Rocket Motors Upgraded (SRMUs) 12 and 14 as the first stage, each having a sea level thrust of 1,385,800 lbf at liftoff, burning in parallel with second and third stages 16 and 18, respectively, each of which is a modified Titan liquid stage with two engines each having a thrust of 226,231 lbf at liftoff. Thus the total vehicle thrust at liftoff is 3.2 million lbf with all engines performing nominally. Launch vehicle 10 employs a modified Centaur 20 for the upper stage in the central vehicle stack, which burns in series with the third stage 18. The modified Centaur 20 may preferably be propelled by two, up rated RL-10 engines with an Isp of 460 seconds and 34,000 lbf thrust per engine.

Although the improved launch vehicle 10 carries more liquid propellant than does the Titan IV vehicle, its core, stages three 18 and four 20 and the payload, are no longer than that of Titan IV. This is possible because the second stage 16 of the improved vehicle 10 carries all of the propellant burned by both second and third stages 16 and 18 during their parallel burn. This is made possible by supplying propellant through an interstage propellant manifold (illustrated in FIG. 3) from second stage 16 only, to the engines of both second and third stages 16 and 18 during their parallel burn. Therefore, the third stage 18 carries only the propellant it must burn after staging of second stage 16. Thus the overall length and weight of third and fourth stages is minimized, with a corresponding increase in stage stiffness and payload performance.

The launch vehicle 10 is stiffened during the parallel burn of stages two 16 and three 18 by a number of interstage structural load carrying and separation attachments (not shown). These may take the form of explosive bolts or other releasable rigid coupling mechanisms. As noted above, and as will be discussed in more detail below in relation to FIG. 3, interstage propellant manifolding is employed between stages 16 and 18. As a result, the end of the second burn of the vehicle 10 occurs at an altitude above that where high altitude winds present a problem. Thus, the high altitude winds will not be a major limitation on launch vehicle availability.

Figure 3:
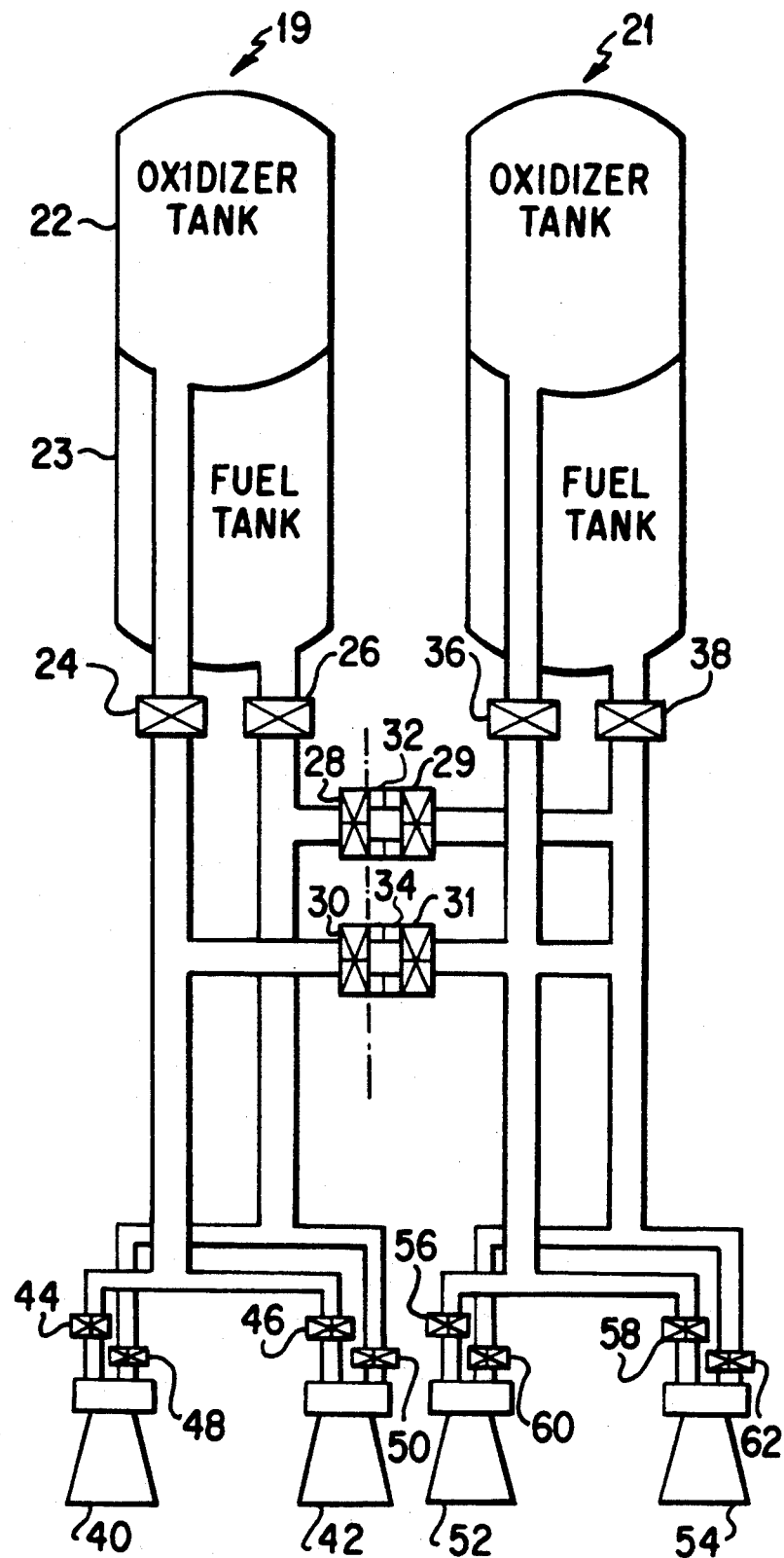
FIG. 3 is a schematic drawing illustrating the interstage propellent manifolding employed in the improved launch vehicle of the present invention.

Referring to FIG. 3, a preferred embodiment for controlling interstage propellant transfer between the parallel burn liquid stages 16 and 18 is illustrated in a cross-sectional schematic view. In a preferred embodiment, propellant utilization by both stages 16 and 18 engines from second stage 16 propellant tanks is achieved by a manifold structure interconnecting the parallel stages 16 and 18 in the vehicle. It will be appreciated that several forms of interstage propellant transfer may also be employed, including passive transfer and active pumping systems. Referring to FIG. 3, the propellant tanks 19 for second stage 16 and 21 for third stage 18 are shown, each of which includes an oxidizer tank and a fuel tank. The oxidizer tank 22 and fuel tank 23 of second stage 16 are manifolded through second stage outlet valves 24 and 26 through pairs of manifold valves 28, 29 and 30, 31 which are required to optionally burn propellant from second stage 16 or third stage 18, first. As will be discussed below, this optional propellant utilization ability allows for higher vehicle performance, redundant stages and increased reliability. Associated with the manifold valves 28, 29, 30 and 31 are quick disconnects 32 and 34 which permit separation of the two stages at any time. Third stage propellant tanks 21 have oxidizer and fuel outlet valves 36, 38 similar to those of second stage tanks 19. The second stage 16 has two engines 40, 42 which have oxidizer inlet valves 44 and 46 and fuel inlet valves 48 and 50. The third stage 18 also has two engines 52 and 54 which have oxidizer inlet valves 56 and 58 and fuel inlet valves 60 and 62.

The operation sequence of the interstage manifolding will next be described for a nominal launch. Starting with lift off, all valves are open except third stage outlet valves 36 and 38. Thus during the parallel burn of second stage 16 and third stage 18 all engines are utilizing propellants only from the second stage tanks 19. To initiate staging of the second stage at the end of its burn, valve changes and disconnect activations are, in rapid sequence as follows:

(1) Open third stage tank outlet valves 36 and 38.
(2) Close all second stage engine inlet valves 44, 46, 48 and 50.
(3) Close manifold valves 28, 29, 30 and 31.
(4) Close stage two outlet valves 24 and 26.
(5) Activate disconnects 32 and 34.

As noted above, the sequence provides the desired propellant transfer during a nominal launch. Additionally, the manifolding in combination with the staging capability of stages 16 and 18 can provide significant reliability increases. This may be appreciated from consideration of several launch scenarios and the appropriate manifolding and staging sequence for each scenario which are briefly discussed below.

One stage failure scenario is for stage two 16 to experience a failure that causes loss of thrust of that stage at lift off. In this case the second stage engine inlet valves 44, 46, 48 and 50 would be closed with all other manifold valves remaining set for nominal operation at liftoff. In this configuration, stage three engines would burn the propellant from stage two tanks 22 and 23 only. Upon approaching stage two propellant depletion, the nominal valve sequencing to stage the second stage would be initiated. Subsequent to stage two staging, stage three would function in a nominal sequence. This has the effect of changing stage two 16 to a drop tank and three 18 to a single stage and utilizing all of the propellant from both to accommodate the loss of thrust in stage two, 16.

Should the third stage 18 fail during first burn, two design options exist: jettison third stage 18 immediately or retain third stage 18, burning the stage three propellant with the stage two engines. The first option is preferable from the standpoint of vehicle reliability, in that it reduces the probability that the third stage 18 failure will propagate into other parts of the vehicle. However, for some vehicle configurations, the third stage 18 structure may be essential to the delivery of thrust loads from second stage 16 to fourth stage 20 and for providing structural stability for wind and other dynamic loads. Thus, the continuing presence of third stage 18 may be required until the burn out and staging of second stage 16. In the first option, wherein second stage 18 is jettisoned, the following actions occur in rapid sequence.

(1) Close all engine inlet valves on third stage 18, i.e , valves 56, 58, 60 and 62.

(2) Close manifold valves 28, 29, 30 and 31.

(3) Activate disconnects 32 and 34.

For the second option where third stage 18 is retained and second stage 16 engines burn all of the propellants from second stage 16 and third stage 18, the following sequence of actions is taken (to burn the propellants in third stage 18 first, followed by burning the propellants in second stage 16):

(1) Close all the engine inlet valves on third stage 18, i.e., valves 56, 58, 60, and 62.

(2) Open third stage propellant tank outlet valves 36 and 38.

(3) Close second stage 16 propellant tank outlet valves 24 and 26.

This status of the manifold permits burning of propellants from third stage 18 tanks while holding propellants in second stage 16. Subsequently, just before depletion of propellant tanks in third stage 18:

(1) Open second stage propellant tank outlet valves 24 and 26.

(2) Close third stage propellant tank outlet valves 36 and 38.

Generally, the function of the interstage propellant module, in the event of the failure of stage two 16 or stage three 18 to thrust, is to reconfigure the launch vehicle from a four to a three stage or a three and one half stage (thrusting stage plus a drop tank) vehicle; i.e. operate the two stages 16 and 18 as a single, thrusting stage. When either stage 16 or 18 fails, it functions only as a set of propellant tanks thereafter. After the failure, the interstage propellant manifold is operated to manage the propellant utilization and staging sequences so as to maximize vehicle payload performance under the particular failure circumstances. In the event of a failure, the required changes in vehicle sequencing may preferably be triggered by on-board computer or base crew monitoring of in flight telemetry for indications of imminent stage failure. For example, the following telemetry may be used: (1) in propulsion, propellant tanks, manifolds and engine compartments; temperatures, pressures and indications of fire and; (2) in avionics; indicators such as timing sequences, cut off signals, and engine actuator positions.

In addition to providing a successful launch in the event of failure of Titan liquid stage two 16 or three 18 to thrust, the improved launch vehicle 10 in accordance with the present invention may be launched with a less conservative failure mode, i.e., one engine fails non-catastrophically (one engine-out) in either stage two or three 16 or 18. In this event the sequencing of the valves is identical to that described for a nominal launch. However, the timing is changed to accommodate the changes in propellant mass flow, associated with the engine failure.

In general, for N stages burning in parallel each of the $N-1$ stages would be manifolded to the Nth stage as shown in FIG. 3. This, in effect, would provide manifolding among the tanks of all stages through the Nth stage manifold segment. Thus, during each of the N burns, propellant could be supplied to all of the engines participating in that burn from any combination of stage tanks present during that burn.

Weight and performance data of the improved vehicle 10 are shown in Tables 1 and 2 with a benign failure of stage three at lift off and one engine failed benignly in stage three at lift off respectively.

The implications of the assumption that the failure occurs at liftoff are that the vehicle would be launched with the appropriate number of liquid engines not ignited at liftoff to simulate the failure. This is necessary to avoid overheating and excessive loads on the vehicle as it traverses the atmosphere. Therefore, for the improved vehicle 10, and others illustrated later, there may be a requirement for liquid engine ignition in flight and in some cases early engine shutdowns to avoid excessive G loads on the vehicle and payload.

TABLE 1

Vehicle 10 Weight and Performance Data
With Stage Three Benign Failure At Lift Off

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 211759 | 0 | 452463 | 551784 | 301.7 | 1828.916 |
| 3 | 115.8 | 273.93 | 389.7 | 501000 | 47017 | 452463 | 551784 | 301.7 | 1828.916 |
| 4 | 389.7 | 676.47 | 1066.2 | 100000 | 13359 | 68000 | 68000 | 460.0 | 147.826 |

Gross Weight at liftoff 2419000 lb.
Payload weight
GEO 17700
GTO 33900
LEO 66000

TABLE 2

Vehicle 10 Weight and Performance Data
With One Engine-Out in Stage Three at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.78 | 1370262 | 147902 | 2771600 | 3380000 | 285.6 | 11834.734 |
| 2 | 0.0 | 115.78 | 115.78 | 317637 | 0 | 678694 | 827676 | 301.7 | 2743.374 |
| 3 | 115.8 | 65.30 | 181.10 | 179134 | 32770 | 678694 | 827676 | 301.7 | 2743.374 |
| 4 | 181.1 | 236.19 | 417.29 | 215988 | 14248 | 226231 | 275892 | 301.7 | 914.458 |

TABLE 2-continued

Vehicle 10 Weight and Performance Data
With One Engine-Out in Stage Three at Liftoff

| 5 | 417.3 | 676.47 | 1093.76 | 100000 | 13359 | 68000 | 68000 | 460.0 | 147.826 |

Gross Weight  2421966 lb.
at liftoff
Payload weight
GEO  20901
GTO  38779
LEO  74288

Also, the payloads illustrated were not obtained by means of full, six dimensional, simulations. Therefore, the vehicle performances illustrated should generally be conservative with respect to the actual capabilities.

The failures are assumed to be in the third stage because they lead to the lowest payload performances for the redundant stage and engine-out failure modes. Thus, the payload would be limited to the values shown to cover these and other contingencies. Payload weights are shown for three different orbits; 1) Geosynchronous Orbit (GEO), 2) Geosynchronous Transfer Orbit (GTO) and 3) the U.S. Space Station Orbit (LEO) at an altitude of 240 nautical miles and orbital inclination of 28.5 degrees.

Another embodiment of the current invention is a launch vehicle having the same number of stages and characteristics of vehicle 10 utilizing modified Atlas II stages instead of Titan stages. Each Atlas stage has three engines; two booster engines, each engine with 237,919 lbf at sea level and one sustainer engine with 72,397 lbf. Thus, with all engines thrusting nominally, the total thrust at liftoff, including SRMUs is approximately 3.3 million lbf. The vehicle has the same launch sequence and utilizes the same propellant manifold, (illustrated in FIG. 3) as vehicle 10.

Weight and performance data of this improved Atlas vehicle of configuration 10 are shown in Table 3 with a benign failure of stage three at liftoff. This failure leads to the lowest payload performances for the redundant stage failure modes. Thus, the payload would be limited to these values to cover those and other contingencies.

Another embodiment of the current invention would be to utilize modified Delta II stages instead of Titan stages in the vehicle 10 configuration. This would yield a vehicle of lower payload performance due to the lower thrust of the Delta stage.

The failure probabilities for vehicle 10 can be projected from the failure histories of the Titan and Centaur families. Table 4 presents the historical and projected failure ratios for major subsystems for the Titan family.

TABLE 3

Atlas Vehicle 10 Weight and Performance Data
With Stage Three Benign Failure at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 242641 | 0 | 549839 | 615721 | 293.8 | 2095.640 |
| 3 | 115.8 | 280.75 | 396.5 | 588359 | 59427 | 549839 | 615721 | 293.8 | 2099.208 |
| 4 | 396.5 | 568.24 | 964.8 | 84364 | 10727 | 68000 | 68000 | 460.0 | 148.467 |

Gross Weight  2530558 lbs.
At liftoff
Payload Weight
GEO  16745
GTO  31154
LEO  59833

The failures are categorized on the basis of engineering judgment as to whether they would have been other subsystems and, therefore, failure of the vehicle. The failures shown do not include failures which are thought to have been fixed by changes in design. The 2.5 and 0.5 benign and catastrophic propulsion failures derive from 3 failures, one of which is judged to be equally probable of being benign or catastrophic.

TABLE 4

Titan Family Failure History and Projections
(149 Titan Launches)

| | Number of Failures | Failure Ratio | | | |
|---|---|---|---|---|---|
| | | History | | Projected | |
| | | Per Vehicle | Per Engine | Per Engine | Per Stage with Two Engines |
| Benign Failures | | | | | |
| Liquid Propulsion | 2.5 | 0.017 | 0.006 | 0.006 | 0.012 |
| Other | 0 | 0 | 0 | — | 0.005 |
| Catastrophic Failures | | | | | |
| Solid Propulsion (77 launches) | 1 | 0.013 | 0.0065 | 0.005 | 0.010 |
| Liquid Propulsion | 0.5 | 0.003 | 0.001 | 0.001 | 0.002 |
| Other | 0 | 0 | 0 | 0 | 0 |
| Postulated Manifold Subsystem Failure Ratios Per Stage | | | | | |

TABLE 4-continued

Titan Family Failure History and Projections
(149 Titan Launches)

|  | Number of Failures | Failure Ratio | | | |
|---|---|---|---|---|---|
|  |  | History | | Projected | |
|  |  | Per Vehicle | Per Engine | Per Engine | Per Stage with Two Engines |
| Benign |  |  |  |  | 0.003 |
| Catastrophic |  |  |  |  | 0.001 |

Shown also are the postulated failure probabilities for the interstage propellant transfer manifold for which there is no launch history. The assigned values are thought to be conservative estimates based upon the similarity between the manifold system and the propellant transfer systems between stage tanks and engines.

The failure history for Centaur is 2 propulsion system failures in 67 trials, not including design failures, yielding a failure ratio of 0.03. Since any failure in Centaur will lead to a mission failure, there is no necessity to differentiate between catastrophic and benign failures.

In general, it can be shown that, for sufficiently small probabilities, the failure ratio (probability) of a system can be approximated by adding the failure ratios of its subsystems. This technique will be utilized, where appropriate, in this analysis. Also, since the vehicles considered will have capabilities to meet mission requirements with one liquid engine or stage failed benignly, probabilities of two or more failures of N units must be projected. The general expression for that probability ($P_{N,2}$) is given by equation 1.

$$P_{N,2} = 1 - (1 - BFP)^N - N(BFP)(1 - BFP)^{N-1} \quad (1)$$

where BFP is the benign failure probability of the liquid engine or stage, as the case may be.

Projected failure probabilities for vehicle 10, launched with different degrees of redundancy, are shown in Table 5. Should vehicle 10 be flown with a payload that required the performance that could be achieved only if all subsystems functioned nominally, the projected mission failure probability would be about 0.086. The corresponding number of expected launches between failures is 12 (the reciprocal of the failure probability). With a redundant stage capability, the vehicle can meet the specified payload capability even though one of its stages fail to thrust at lift off.

TABLE 5

Projected Failure Probabilities for Vehicle 10
With and Without Redundancy

| Failure | Probability | | |
|---|---|---|---|
|  | No Redundancy | Redundant Stage Capability | One Engine-Out Capability |
| Titan Stages | | | |
| Benign | | | |
| Liquid Propulsion | 2(0.012) |  |  |
| Manifold | 2(0.003) |  | 2(0.003) |
| Other | 2(0.005) |  | 2(0.005) |
| Total Benign | 0.040 | 0 | 0.016 |
| Catastrophic Failure | | | |

TABLE 5-continued

Projected Failure Probabilities for Vehicle 10
With and Without Redundancy

| Failure | Probability | | |
|---|---|---|---|
|  | No Redundancy | Redundant Stage Capability | One Engine-Out Capability |
| Solid Propulsion | 0.010 | 0.010 | 0.010 |
| Liquid Propulsion | 2(0.002) | 2(0.002) | 2(0.002) |
| Manifold | 2(0.001) | 2(0.001) | 2(0.001) |
| Other | 0 | 0 | 0 |
| Total Catastrophic | 0.016 | 0.016 | 0.016 |
| Centaur Stage Total | 0.030 | 0.030 | 0.030 |
| Mission Failure | 0.086 | 0.046 | 0.062 |
| Expected Number of Launches Between Failures | 12 | 22 | 16 |

Thus, vehicle 10, launched with a redundant stage capability, would fail if both stages failed. From Table 5 the probability of the two stages failing benignly is (0.005 + 0.003)(0.005 + 0.003) which is less than one in ten thousand. Thus, vehicle 10, launched with a redundant stage capability, has a probability of nearly zero of failing due to benign failures in the Titan liquid stages. Therefore, the redundant stage capability, compared to no redundancy, roughly halves the vehicle failure probability and doubles the expected number of launches between failures.

Utilizing data from Table 4 and equation (1), it can be seen that, with a one engine-out capability, the probability of two or more engines failing is nearly zero. However, other benign failures in a stage may cause mission failure, accordingly, the expected failure probability and expected number of launches between failures lie between the values for no redundancy and stage redundancy.

The failure probabilities for the Atlas vehicle of configuration 10 can be projected from the failure histories of the Atlas, SRMUs and Centaur families. Table 6 presents the historical and projected failure ratios for major subsystems for the Atlas family. The Atlas failures are categorized on the basis of engineering judgment as to whether they would have been catastrophic or benign with respect to causing other subsystem failures in the vehicle. The failures shown do not include failures which are thought to have been fixed by changes in design. The 9.5 and 0.5 benign and catastrophic propulsion failures derive from 10 failures, one of which is judged to be equally probable of being benign or catastrophic. Projected SRMU and Centaur failure ratios are the same as those shown in Table 4.

TABLE 6
Atlas Family History and Projections
(260 Atlas Space Vehicle Launches)

| | Number of Failures | Failure Ratio | | | |
|---|---|---|---|---|---|
| | | History | | Projected | |
| | | Per Stage | Per Engine | Per Engine | Per Stage With Three Engines |
| Benign Failures | | | | | |
| Liquid Propulsion | 9.5 | 0.037 | 0.012 | 0.008 | 0.024 |
| Other | 3 | 0.012 | — | — | 0.005 |
| Catastrophic Failures | | | | | |
| Solid Propulsion (77 launches) | 1 | 0.013 | 0.0065 | 0.005 | 0.010 |
| Liquid Propulsion | 0.5 | 0.002 | 0.001 | 0.001 | 0.003 |
| Other | 0 | 0 | 0 | 0 | 0 |
| Postulated Manifold Subsystem Failure Ratios | | | | | |
| Benign | | | | | 0.003 |
| Catastrophic | | | | | 0.001 |

Projected failure probabilities for the Atlas vehicle of configuration 10, launched with different degrees of redundancy, are shown in Table 7. Should the vehicle be flown with a payload that required the performance that could be achieved only if all subsystems functioned nominally, the projected mission failure probability would be about 0.112. The corresponding number of expected launches between failures is 9 (the reciprocal of the failure probability). With stage redundancy, the probability of two stages failing is approximately 0.001. Thus, launching in a redundant stage mode would roughly halve the failure probability and double the expected number of launches between failures. With a one engine-out capability, the probability of two or more engines failing is approximately 0.001. However, other benign failures in a stage may cause mission failure. Accordingly, the failure probability and expected number of launches between failures lie between the values for no redundancy and stage redundancy.

Utilization of Atlas stages in the vehicle configuration offers the possibility of lowering or increasing the stage thrust by deleting the sustainer engine or replacing it with a booster engine. Accordingly, there is available a range of vehicle performances with associated small changes in vehicle failure probabilities.

FIG. 4(b) illustrates another improved launch vehicle 64 in accordance with the present invention. A conventional Titan IV having a Centaur upper stage is shown in FIG. 4(a) for comparison.

The improved launch vehicle 64 is a four stage vehicle, utilizing two SRMUs as the first stage, 66 and 68 burning in parallel with stages two and three. Stage two is comprised of two Titan liquid stages, 70 and 72, each with two engines, "strapped-on" to third stage 74. Stage three is a single Titan stage with two engines. The fourth stage, a modified Centaur 76 for vehicle 64, has the same propulsion characteristics as described for vehicle 10.

TABLE 7
Projected Failure Probabilities for Atlas Vehicle 10 With and Without Redundancy

| | Probability | | |
|---|---|---|---|
| Failure | No Redundancy | Redundant Stage | One Engine-Out Capability |
| Atlas Stages | | | |
| Benign | | | |
| Liquid Propulsion | 2(0.024) | | 0.001 |
| Manifold | 2(0.003) | | 2(0.003) |

TABLE 7-continued
Projected Failure Probabilities for Atlas Vehicle 10 With and Without Redundancy

| | Probability | | |
|---|---|---|---|
| Failure | No Redundancy | Redundant Stage | One Engine-Out Capability |
| Other | 2(0.005) | | 2(0.005) |
| Total Benign | 0.064 | 0.001 | 0.017 |
| Catastrophic Failure | | | |
| Solid Propulsion | 0.010 | 0.010 | 0.010 |
| Liquid Propulsion | 2(0.003) | 2(0.003) | 2(0.003) |
| Manifold | 2(0.001) | 2(0.001) | 2(0.001) |
| Other | 0 | 0 | 0 |
| Total Catastrophic | 0.018 | 0.018 | 0.018 |
| Centaur Stage Total | 0.030 | 0.030 | 0.030 |
| Mission Failure | 0.112 | 0.049 | 0.065 |
| Expected Number of Launches between failures | 9 | 20 | 15 |

Although vehicle 64 carries more liquid propellant than vehicle 10 or Titan IV, its core vehicle, stage three 74 plus Centaur 76 plus payload, is no longer than that of Titan IV or vehicle 10. This is made possible by supplying the propellant from the stage two "strap-on" booster's 70 and 72, only, to all of the engines of stages two and three during their parallel burn. Therefore, stage three 74 carries only the propellant it must burn after staging of stage two. Thus its length and weight are minimized with a corresponding increase in vehicle performance and stiffness.

As in the case of vehicle 10, stages two and three continue to burn in parallel to an altitude beyond which high altitude wind loads are a problem. Thus high altitude wind loads should not be a factor in limiting launch availability of vehicle 64.

Figure 5:
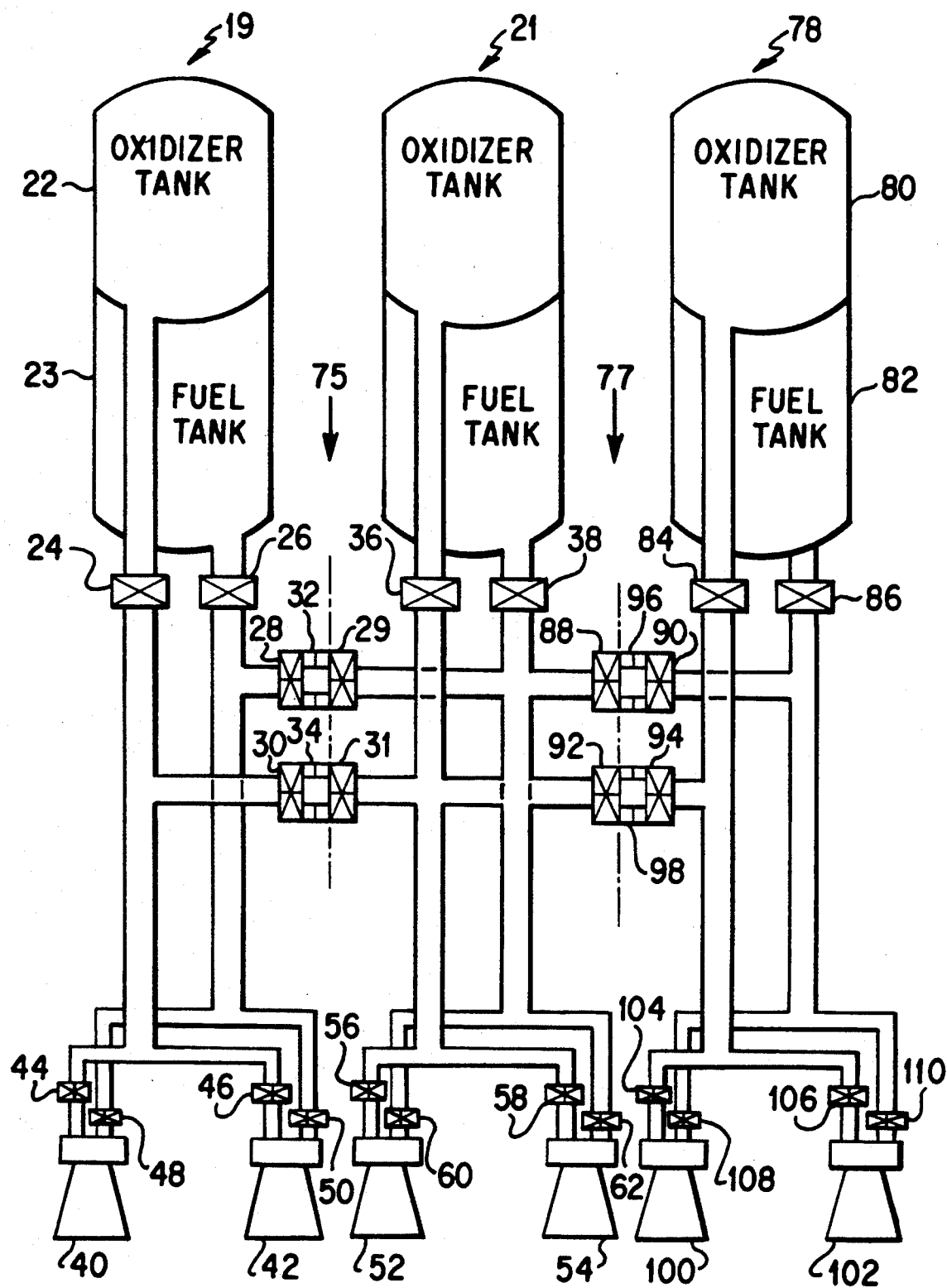
FIG. 5 is a schematic drawing illustrating the propellant manifolding employed in the improved launch vehicle of FIGS. 4(b) and 4(c).

Referring to FIG. 5, the interstage propellant manifold system for vehicle 64 is illustrated. The manifold system illustrated in FIG. 5 is an extension of that illustrated in FIG. 3 for vehicle 10. The extension is required to incorporate the second booster 72 into the propellant manifold, which, with booster 70, comprises the second stage. As shown in FIG. 5: 1) the manifold segment 75 between booster 70 of the second stage and stage three 74, is identical to that of vehicle 10 illustrated in FIG. 3 (and is labeled with matching reference numerals), and 2) the manifold segment 77 between the second booster 72 of stage two and stage three 74 is a replication of the first manifold. Addressing the second manifold segment, the propellant tanks 78 and 21 for the second stage booster 72 and for third stage 74, respectively are shown, each of which includes an oxidizer tank and a fuel tank. The oxidizer tank 80 and fuel tank 82 of second stage booster 72 are manifolded through second booster stage 72 outlet valves 84 and 86 through pairs of manifold valves 88, 90 and 92, 94 which are required to optionally burn propellant from second stage boosters 70 and 72 or third stage 74 first. As will be discussed below, this optional propellant utilization ability allows for higher vehicle performance, redundant stages and increased reliability. Associated with the manifold valves 88, 90, 92 and 94 are quick disconnects 96 and 98 which permit separation of the stage two booster 72 and stage three 74 at any time. Third stage propellant tank 21 has oxidizer and fuel outlet valves 36, 38 similar to those of second stage tanks 78. The second stage booster 72 has two engines 100, 102 which have oxidizer inlet valves 104 and 106 and fuel inlet valves 108 and 110. The third stage 74 also has two engines 52 and 54 which have oxidizer inlet valves 56 and 58 and fuel inlet valves 60 and 62.

The operation sequence of the interstage manifolding will next be described for a nominal launch. Starting with lift off, all valves are open except third stage outlet valves 36 and 38. Thus during the parallel burn of second stage boosters 70 and 72 and third stage 74, all engines are utilizing propellants only from the second stage tanks 19 and 78. To initiate staging of the second stage boosters 70 and 72 at the end of their burn, valve changes and disconnect activations are, in rapid sequence as follows:

(1) Open third stage tank outlet valves 36 and 38.
(2) Close all second stage engine inlet valves 44, 46, 48, 50, 104, 106, 108 and 110.
(3) Close manifold valves 28, 29, 30 and 31, and 88, 90, 92 and 94.
(4) Close stage two outlet valves 24 and 26, and B4 and 86.
(5) Activate disconnects 32 and 34, and 96 and 98.

As noted above, the sequence provides the desired propellant transfer during a nominal launch. Additionally, the manifolding in combination with the staging capability of stage two booster stages 70 and 72 and stage three 74 can provide significant reliability increases. This may be appreciated from consideration of several launch scenarios and the appropriate manifolding and staging sequence for each scenario which are briefly discussed below.

One stage failure scenario is for the stage two booster 70 to fail to thrust at liftoff. In this case, the booster 70 engine inlet valves 44, 46, 48 and 50 would be closed. Additionally, outlet valves 84, 86 on second stage booster 72 would be closed with all other manifold valves remaining set for nominal operation at liftoff. This would enable propellant burning only from the failed booster 70 tanks 22 and 23 by the engines of booster 72 and stage three 74. Upon nearing depletion of booster 70 propellant tanks 22 and 23, manifold valves 24, 26, 28, 29, 30 and 31 would be closed and, when appropriate, separation devices 32 and 34 would be activated to separate booster 70. Subsequent to staging of booster 70, second stage booster 72 and stage three 74 would continue to function in a normal sequence.

Should stage two booster 72 fail to thrust at liftoff, the manifold sequencing would be identical to that described above with the roles of the manifold segments of stage two boosters 70 and 72 reversed.

Should the third stage 74 fail during first burn, two design options exist: jettison third stage 74 immediately or retain third stage 74, burning the stage three propellant with the stage two engines. The first option is preferable from the standpoint of vehicle reliability, in that it reduces the probability that the third stage 74 failure will propagate into other parts of the vehicle. However, for some vehicle configurations, the third stage 74 structure may be essential to the delivery of thrust loads from second stage boosters 70 and 72 to fourth stage 76 and for providing structural stability for wind and other dynamic loads. Thus, the continuing presence of third stage 74 may be required until the burn out and staging of second stage boosters 70 and 72. In the first option, wherein third stage 74 is jettisoned, the following actions occur in rapid sequence.

(1) Close all engine inlet valves on third stage 74, i.e., valves 56, 58, 60 and 62.
(2) Close manifold valves 28, 29, 30 and 31, and 88, 90, 92 and 94.
(3) Activate disconnects 32, 34, 96 and 98.

For the second option where third stage 74 is retained and second stage booster 70 and 72 engines burn all of the propellants from second stage booster 70 and third stage 74, the following sequence of actions is taken (to burn the propellants in stage two booster 70 and third stage 74 first, followed by burning the propellants in second stage booster 72):

(1) Close all the engine inlet valves on third stage 74, i.e., valves 56, 58, 60, and 62.
(2) Open third stage propellant tank outlet valves 36 and 38.
(3) Close stage two booster 72 propellant tank outlet valves 84 and 86.

This status of the manifold permits burning of propellants from stage two booster 70 and third stage 74 tanks while holding propellants in stage two booster 72. Subsequently, just before depletion of propellant tanks in stage two booster 70 and third stage 74:

(1) Open stage two booster 72 propellant tank outlet valves 84 and 86.
(2) Close stage two booster 70 and stage three 74 propellant tank outlet valves 24 and 26, and 36 and 38.
(3) When appropriate, activate separation devices 32 and 34 to separate stage two booster 70.

Subsequent to the above described actions, stage two booster 72, would function as the third stage of the vehicle. Upon depletion of booster 72 propellant tanks 80 and 82, that booster and stage three 74 would be staged, with stage four 76 operating in a nominal sequence thereafter.

In general, the interstage propellant manifold is designed and programmed to reconfigure the launch vehicle, in real time, to accommodate a benign failure of one of the Titan liquid stages by 1) utilizing the failed stage as a propellant tank only and 2) scheduling the utilization of its propellant and its staging so as to minimize the loss in vehicle payload performance due to the failure. In the event of a failure, the required changes in vehicle sequencing may preferably be triggered by a ground based crew monitoring standard in-flight telemetry for indications of imminent stage failure. For example, the following telemetry may be used: (1) In propulsion, propellant tanks, manifolds and engine compartments; temperatures, pressures and indications of fire and; (2) In avionics; indicators such as timing sequences, cut off signals, and engine actuator positions.

In addition to providing a successful launch in the event of failure of the Titan liquid stages 70, 72 or 74, the improved launch vehicle 64 in accordance with the present invention may be launched with a less conservative failure mode, i.e., one engine fails benignly (one engine-out) in any of the Titan liquid stages 70, 72 or 74. In this event, the sequencing of the valves is identical to that described for a nominal launch. However, the timing is changed to accommodate the changes in propellant mass flow, associated with the engine failure.

In general, for N stages burning in parallel each of the N−1 stages would be manifolded to the Nth stage as shown in FIG. 5. This, in effect, would provide manifolding among the tanks of all stages through the Nth stage manifold segment. Thus, during each of the N burns, propellant could be supplied to all of the engines participating in that burn from any combination of stage tanks present during that burn.

Weight and performance data of the improved vehicle 64 are shown in Tables 8 and 9 with a benign failure of stage three at liftoff and one engine failed benignly in stage three at liftoff respectively. These failures lead to the lowest payload performances for the redundant stage and engine-out failure modes. Thus, the payload would be limited to the values shown to cover those and other contingencies.

The failure probabilities for vehicle 64 can be projected in the same manner as those described for vehicle 10. The projected values are shown in Table 10. Using the projected liquid stage and engine benign failure probabilities from Table 4, the probability of two or more redundant stages failing is approximately zero. The probability of two or more engines failing for one engine-out capability is approximately 0.001. Comparing the mission failure probabilities and expected number of launches between mission failures for vehicles 10 and 64 shown in Tables 5 and 10 it can be seen that, these operational parameters are degraded for the higher performance vehicles. However, with increasing redundancy the differences in failure probabilities and mean numbers of launches between failures become slight. Thus the incorporation of a redundant stage capability into launch vehicles minimizes the increase in failure probability with increasing performance.

A vehicle utilizing modified Atlas II stages, having the same configuration and launch sequence as Atlas vehicle 64 would have nearly the same payload performances, as shown in Tables 11 and 12. Also, the failure probabilities would as shown in Table 13.

TABLE 8

Vehicle 64 Weight and Performance Data
With Stage Three Benign Failure at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 423516 | 0 | 904926 | 1103568 | 301.7 | 3657.832 |
| 3 | 115.8 | 55.97 | 171.8 | 204742 | 30295 | 904926 | 1103568 | 301.7 | 3657.832 |
| 4 | 171.8 | 251.11 | 422.9 | 459258 | 41509 | 452463 | 551784 | 301.7 | 1828.916 |
| 5 | 422.9 | 710.29 | 1133.2 | 105000 | 14027 | 68000 | 68000 | 460.0 | 147.826 |

Gross Weight at liftoff 2829000 lb.
Payload Weight
GEO 22000
GTO 41000
LEO 79000

TABLE 9

Vehicle 64 Weight and Performance Data
With One Engine Benign Failure in Third State at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.80 | 115.8 | 1370261 | 147903 | 3771600 | 2380000 | 285.6 | 11833.077 |
| 2 | 0.0 | 115.80 | 150.0 | 529469 | 0 | 1131157 | 1379460 | 301.7 | 4572.290 |
| 3 | 150.0 | 107.65 | 223.4 | 492187 | 67394 | 1131157 | 1379460 | 301.7 | 4572.290 |
| 4 | 223.4 | 251.52 | 475.0 | 230000 | 15172 | 275892 | 275892 | 301.7 | 914.458 |
| 5 | 475.0 | 676.47 | 1151.4 | 100000 | 13483 | 68000 | 68000 | 460.0 | 147.826 |

Gross Weight at Liftoff 3000000 lb.
Payload Weight
GEO 25000
GTO 45000
LEO 85000

TABLE 10

Projected Failure Probabilities for Vehicle 64
With and Without Redundancy

| Failure | Probability No Redundancy | Redundant Stage | One Engine-Out Capability |
|---|---|---|---|
| Titan Stages | | | |
| Benign | | | |
| Liquid Propulsion | 3(0.012) | | 0.001 |
| Manifold | 3(0.003) | | 3(0.003) |
| Other | 3(0.005) | | 3(0.005) |
| Total Benign | 0.060 | 0 | 0.025 |
| Catastrophic Failure | | | |
| Solid Propulsion | 0.010 | 0.010 | 0.010 |
| Liquid Propulsion | 3(0.002) | 3(0.002) | 3(0.002) |
| Manifold | 3(0.001) | 3(0.001) | 3(0.001) |
| Other | 0 | 0 | 0 |
| Total Catastrophic | 0.019 | 0.019 | 0.019 |

TABLE 10-continued

Projected Failure Probabilities for Vehicle 64
With and Without Redundancy

| Failure | Probability | | |
|---|---|---|---|
| | No Redundancy | Redundant Stage | One Engine-Out Capability |
| Centaur Stage Total | 0.030 | 0.030 | 0.030 |
| Mission Failure | 0.109 | 0.049 | 0.074 |
| Expected Number of Launches between failures | 9 | 20 | 14 |

TABLE 11

Atlas Vehicle 64 Weight and Performance Data
With Stage Three Benign Failure at Liftoff

| BURN NO. | TIME START | (SEC) BURN TIME | END OF BURN TOTAL | WEIGHT (LBS) PROPELLANT BURNED | WEIGHT (LBS) BURNOUT STAGED | THRUST (LBF) SEA LEVEL | THRUST (LBF) VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 485279 | 0 | 1099304 | 1231442 | 293.8 | 4191.272 |
| 3 | 115.8 | 68.31 | 184.1 | 286800 | 30575 | 1099304 | 1231442 | 293.8 | 4198.592 |
| 4 | 184.1 | 210.78 | 394.9 | 442721 | 59713 | 549652 | 615721 | 293.8 | 2100.380 |
| 5 | 394.9 | 744.12 | 1139.0 | 110000 | 14695 | 68000 | 68000 | 460.0 | 147.826 |

Gross Weight At Liftoff 2972773 lb.
Payload Weight
GEO 19386
GTO 37159
LEO 72465

TABLE 12

Atlas Vehicle 64 Weight and Performance Data
With One Booster Engine Failure in Third Stage at Liftoff

| BURN NO. | TIME START | (SEC) BURN TIME | END OF BURN TOTAL | WEIGHT (LBS) PROPELLANT BURNED | WEIGHT (LBS) BURNOUT STAGED | THRUST (LBF) SEA LEVEL | THRUST (LBF) VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 620782 | 0 | 1410316 | 1579839 | 294.7 | 5361.590 |
| 3 | 115.8 | 57.11 | 172.9 | 307218 | 61150 | 1410316 | 1579839 | 294.7 | 5379.099 |
| 4 | 172.9 | 244.63 | 417.5 | 286800 | 18886 | 311012 | 348397 | 297.7 | 1172.362 |
| 5 | 417.5 | 744.12 | 1161.6 | 110000 | 14695 | 68000 | 68000 | 460.0 | 147.826 |

Gross Weight at Liftoff 2972773 lb.
Payload Weight
GEO 26640
GTO 48277
LEO 91106

TABLE 13

Projected Failure Probabilities for Vehicle Configuration 64
With Atlas Stages, With and Without Redundancy

| Failure | Probability | | |
|---|---|---|---|
| | No Redundancy | Redundant Stage | One Engine-Out Capability |
| Titan Stages | | | |
| Benign | | | |
| Liquid Propulsion | 3(0.024) | | 0.002 |
| Manifold | 3(0.003) | | 3(0.003) |
| Other | 3(0.005) | | 3(0.005) |
| Total Benign | 0.096 | 0.002 | 0.026 |
| Catastrophic Failure | | | |
| Solid Propulsion | 0.010 | 0.010 | 0.010 |
| Liquid Propulsion | 3(0.003) | 3(0.003) | 3(0.003) |
| Manifold | 3(0.001) | 3(0.001) | 3(0.001) |
| Other | 0 | 0 | 0 |
| Total Catastrophic | 0.022 | 0.022 | 0.022 |
| Centaur Stage Total | 0.030 | 0.030 | 0.030 |
| Mission Failure | 0.148 | 0.054 | 0.078 |
| Expected Number of Launches between failures | 7 | 19 | 13 |

Figures 6A, 6B, 6C:
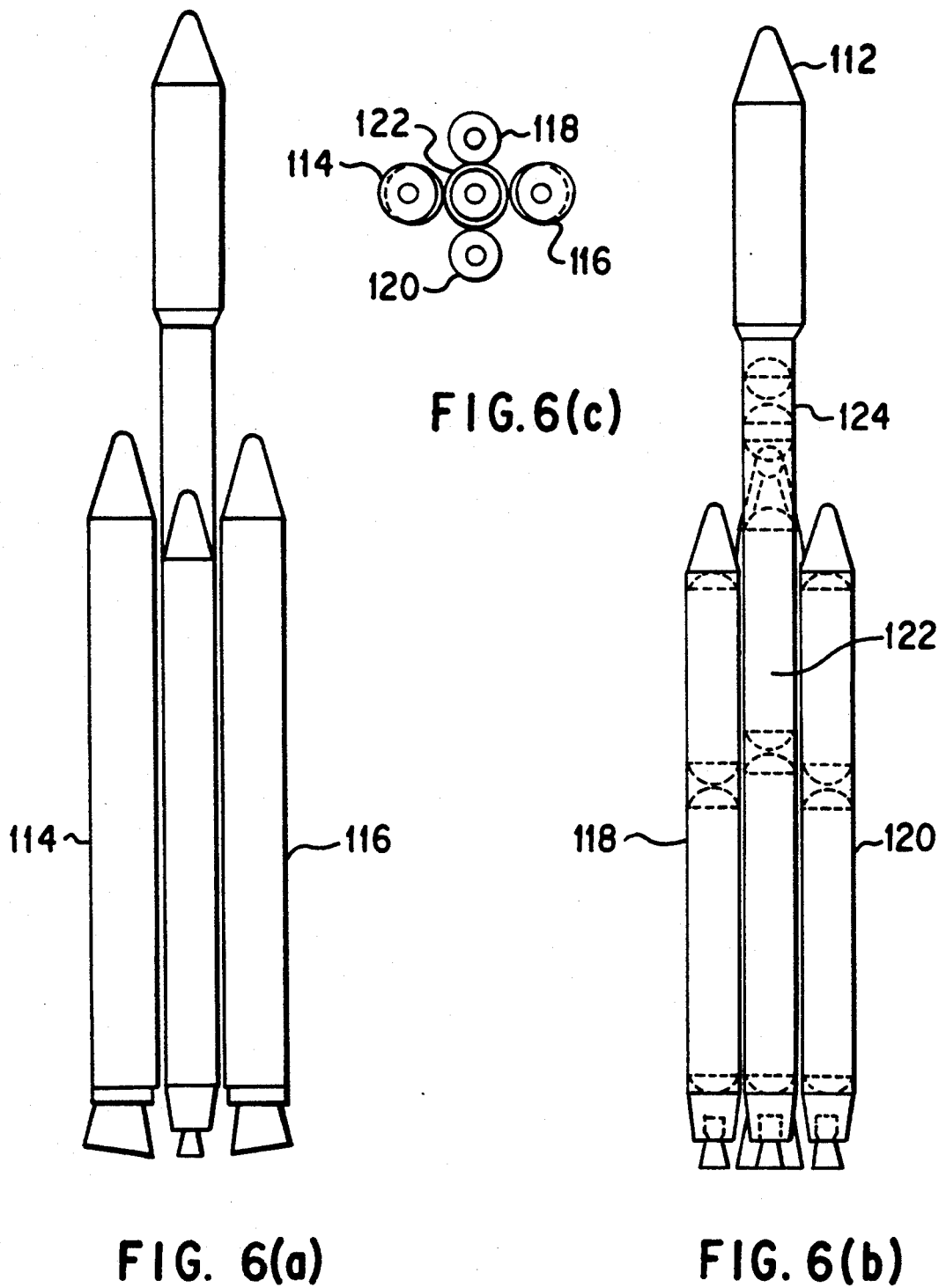
FIG. 6(a), 6(b) and 6(c) are side views and a top view, respectively, of another alternate embodiment of the present invention.

FIGS. 6(a), 6(b) and 6(c) illustrate another improved launch vehicle 112 in accordance with the present invention.

The improved launch vehicle 112 could be launched as a five stage vehicle, utilizing two SRMUs as the first stage, 114 and 116 burning in parallel with three liquid stages, 118, 120 and 122. Stages two and three are modified Delta II liquid stages, 118 and 120, each with a single engine, "strapped-on" to stage four 122, which is also a single Delta stage with one engine. The fifth stage 124 is a modified Delta II upper stage. Each engine in stages 118, 120 and 122 has a thrust of 204,000 lbf at sea level. Thus, including the SRMUs, the thrust at liftoff is approximately 3.4 million lbf.

The vehicle illustrates the Interstage Propellant Transfer Manifold illustrated in FIG. 5. Therefore, stage four 122 carries only the propellant it must burn after staging of the lower stages. Thus, its length and weight are minimized with a corresponding increase in vehicle performance and stiffness. Also, as in the case of vehicles defined earlier, stages three and four continue to burn in parallel at an altitude beyond which high altitude wind loads are a problem. Thus wind loads should not be a factor in limiting launch availability of vehicle 112.

Additionally, the use of the Interstage Propellant Transfer Manifold enables vehicle 112 to operate as a four stage vehicle with either stage two 118, stage three 120, or stage four 122 failed. Performance data are shown for the space station orbit, LEO (circular) at 240 N.Mi altitude and 28.5° inclination, and for a LEO transfer orbit, LEO (transfer), of approximately 78.5 N.Mi. Perigee, 230 N.Mi apogee and 28.5° inclination.

Weight and performance data of the improved vehicle 112 are shown in Tales 14 and 15 with no failures and benign failure of stage four at liftoff.

The results shown do not include performance for the Geosynchronous Orbit because of the limitations of the Delta II upper stage, it utilizes storable propellants and, therefore, does not provide high performance to GEO. This limitation cold be obviated by replacing it with a modified Centaur stage.

The Delta upper stage limitation has the additional effect of causing the vehicle 112 to be optimized so that its lower stages deliver Low Earth Orbital velocity to the upper stage 124 before it is separated and ignited.

ures leaves too small a data base to be useful for projections. However, the similarities in the failure histories for the three vehicle families makes it reasonable to use the overall results to project failure probabilities for Delta. Accordingly, the projections for the Atlas subsystem failure probabilities will also be used for Delta. Additionally, a failure probability of 0.015 will be projected for the Delta II upper stage.

Using these assumptions, the failure probabilities for vehicle 112 can be projected in the same manner as those described previously for other vehicles. The projected values are shown in Table 16. Using the projected benign failure probabilities from Table 6 for the single engine Delta stage, the probabilities for two or more stage failures is predicted to be approximately zero. Thus, launching the vehicle 112 to the GTO with a redundant stage capability would change the failure probability and expected number of launches between failures from 0.079 and 9 to 0.031 and 32. Vehicle 112 without the Delta upper stage could be utilized in support of the Space Station. Launched into the transfer orbit for the station, vehicle 112 (without the Delta upper stage) would have a projected failure probability

TABLE 14

Vehicle 112 Weight and Performance Data With No Vehicle Failure

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 278340 | 17282 | 612000 | 726000 | 302.0 | 2403.974 |
| 3 | 115.8 | 103.68 | 219.5 | 166160 | 17282 | 408000 | 484000 | 302.0 | 1602.649 |
| 4 | 219.5 | 311.98 | 531.4 | 250000 | 20473 | 204000 | 242000 | 302.0 | 801.325 |
| 5 | 531.4 | 669.14 | 1200.6 | 20950 | 3358 | 10000 | 10000 | 319.4 | 31.309 |

Gross Weight At Liftoff  2314000 lb.
Payload Weight
GTO  19500
LEO
(Transfer)  57000
(Circular)  55000

TABLE 15

Vehicle 112 Weight and Performance Data With Stage Four Failure at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 294.67 | 294.7 | 472251 | 17520 | 408000 | 484000 | 302.0 | 1602.649 |
| 3 | 294.7 | 277.35 | 572.0 | 222250 | 35835 | 204000 | 242000 | 302.0 | 801.325 |
| 4 | 572.0 | 669.14 | 1241.2 | 20950 | 3358 | 10000 | 10000 | 319.4 | 31.309 |

Gross Weight At Liftoff  2309000 lb.
Payload Weight
GTO  13000
LEO
(Transfer)  33000
(Circular)  32000

Thus, vehicle 112 has the payload capability for the transfer orbit shown in Tables 15 and 16 without the use of the fifth stage 124. The velocity increase required to adjust from the transfer to the circular Space Station Orbit is minimal and would have to be provided by a small propulsion system in the payload.

The failure history for the Delta vehicle family is different from those of the Titan and Atlas families, in that almost all of the Delta vehicle failures were treated as design failures. As a result, deleting the design failof 0.016 and an expected number of launches between failures of 63, assuming the payload provides vehicle guidance and transfer to the Space Station Orbit.

TABLE 16

Projected Failure Probabilities for Delta Vehicle 112
With and Without Redundancy

| Failure | Probability | |
|---|---|---|
| | No Redundancy | Redundant Stage |
| Delta Stages 118, 120, 122 | | |
| Benign | | |
| Liquid Propulsion | 3(0.008) | |
| Manifold | 3(0.003) | |
| Other | 3(0.005) | |
| Total Benign | 0.048 | 0 |
| Catastrophic Failure | | |
| Solid Propulsion | 0.010 | 0.010 |
| Liquid Propulsion | 3(0.001) | 3(0.001) |
| Manifold | 3(0.001) | 3(0.001) |
| Other | 0 | 0 |
| Total Catastrophic | 0.016 | 0.016 |
| Delta II Stage Five, 124 GTO Mission | 0.015 | 0.015 |
| Failure | 0.079 | 0.031 |
| Expected Number of Launches between failures | 9 | 32 |

TABLE 17

Vehicle 126 Weight and Performance Data
One Engine Failed Benignly in Stage One at Liftoff

| BURN NO. | TIME START | (SEC) BURN TIME | END OF BURN TOTAL | WEIGHT (LBS) PROPELLANT BURNED | WEIGHT (LBS) BURNOUT STAGED | THRUST (LBF) SEA LEVEL | THRUST (LBF) VACUUM | VACUUM SPECIFIC IMPULSE (SEC) | FUEL FLOW RATE LB/SEC |
|---|---|---|---|---|---|---|---|---|---|
| 1 | 0.0 | 64.32 | 64.3 | 294100 | 19430 | 1131157 | 1379460 | 301.7 | 4572.290 |
| 2 | 64.3 | 80.40 | 80.4 | 294100 | 19430 | 904926 | 1103568 | 301.7 | 3657.832 |
| 3 | 144.7 | 84.20 | 228.9 | 154000 | 16786 | 452463 | 551784 | 301.7 | 1828.916 |
| 4 | 228.9 | 345.00 | 573.9 | 51000 | 6819 | 55760 | 68000 | 460.0 | 147.826 |
| 5 | 0.00 | 0.00 | 0.0 | 0 | 0 | 0 | 0 | 0.0 | 0.000 |

| | |
|---|---|
| Gross Weight at Liftoff | 870000 lb. |
| Payload Weight | |
| GEO | 8000 |
| GTO | 16000 |
| LEO | 35000 |

Figure 7A:
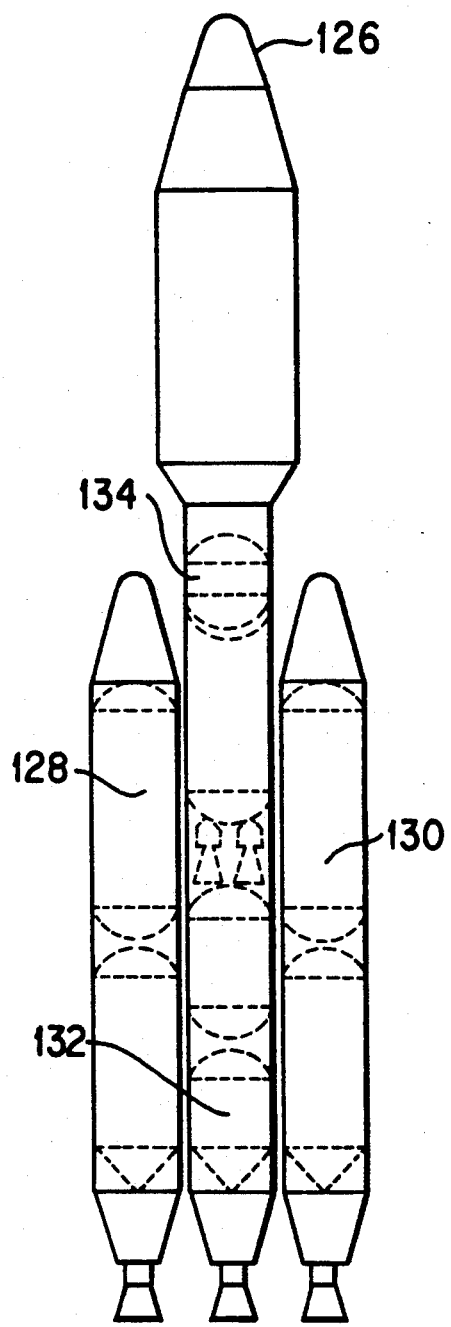
FIGS. 7(a). and 7(b)are a side view and a top view, respectively, of another alternate embodiment of the improved launch vehicle of the present invention.
Figure 7B:
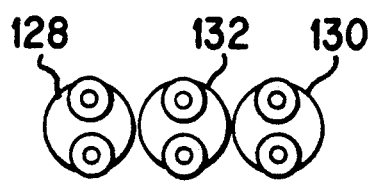

FIGS. 7(a) and 7(b) illustrate another preferred embodiment of the current invention. The vehicle 126 is designed to place a payload in geosynchronous orbit. Additionally, it has capabilities to abort to LEO, in the event of a failure of one of the Titan stages, thereby preserving the payload for subsequent transfer from the abort LEO to the mission GEO. It will be appreciated that the GEO mission is representative of other high energy orbits including a mission for escape from the Earth's gravity.

The overall length of the vehicle 126 is 152 ft as compared to 204 ft for Titan IV. Also, during second burn the core stage is still stiffened by its separable attachments to stage two when the vehicle has reached an altitude above which high altitude winds are not a problem.

The vehicle 126 consists of two modified Titan "strap-on" stages added to a third Titan stage, each with two engines. The two strap-on stages 128 and 130 would serve as the vehicle stages one and two with the core Titan stage being stage three 132, with a Centaur for stage four 134. The three Titan stages have propellant manifolding and burn in parallel. The Centaur would burn in series. Assuming an engine-out in stage one 128 at liftoff, the vehicle gross weight is approximately 870,000 lbs and the performance to GTO and GEO are approximately 16,000 and 8,000 pounds respectively. Vehicle weight and performance data are presented in Table 17. With this vehicle configuration, stages one and two are redundant at liftoff with respect to abort to LEO, i.e., should stage one or two fail it would be jettisoned immediately providing an abort to LEO capability. Should stage three fail it would have to be retained to continue to provide the thrust structure for loads delivered from stages one and two to stage four. Should the failure occur at liftoff the thrust delivered by stages one and two would be inadequate to continue the mission. However, should stage three ail after part way into first burn, an abort to LEO would be successful. Therefore, stages one, two and three provide considerable redundancy with respect to abort to LEO.

Assuming stage three 132 performs nominally part way into first burn, the probabilities of occurrence of operational events can be projected for the vehicle 126 using subsystem failure probabilities from Table 4.

Table 18 presents the failure probabilities for the vehicle 126 broken down by stages and categories of failures. The benign and catastrophic failure probabilities for three Titan stages without redundancy are 0.06 and 0.009 respectively. The same probabilities for the three Titan stages with an engine-out capability in stage one are 0.048 and 0.009. The failure categories for Centaur, are not delineated since that stage must perform without a failure, to achieve either the mission GEO or abort to LEO. In order that the vehicle place the payload into the mission GEO directly, no failure benign or catastrophic) can occur in any stage of the vehicle. The probability of a failure occurring with and without redundancy is 0.087 and 0.099. Thus, the expected number of launches between failures would be 11 and 10. Accordingly, the vehicle would not be operationally viable without an abort to LEO capability. On the other hand, with the Titan stages being redundant with respect to successful abort to LEO, the sum of the benign failures is the probability that the vehicle will go into the abort mode. In order for the abort to be successful, there must be no failure in the Centaur. Therefore, the probability that the vehicle enters an abort and is successful is the product of the total benign failure probabilities of the three Titan stages (0.048) and (0.06) and one minus the total failure probability of the Centaur (1−0.03) which is 0.047 and 0.058 with and without redundancy. Having been placed in the abort orbit successfully, the payload could best be transferred from there to the mission orbit by means of a second use of the Centaur stage, which cold be accomplished most effectively by refueling it on orbit from the U.S. Space Station or the Shuttle orbiter. (The alternative of returning the payload to Earth and re-launching entails significant additional operations and risks). Accordingly, the probability of achieving mission success through the abort mode is 0.045 and 0.056 with and without redundancy, the product of the probabilities of achieving a successful abort and the Centaur transferring the payload from LEO to GEO successfully (0.97). The total probability of achieving mission success is the sum of the probabilities of achieving it directly and achieving it through the abort mode with and without redundancy (1−0.087 + 0.045) equals 0.958 and (1−0.099 + 0.056) equals 0.957 respectively.

TABLE 18

Projected Failure Probabilities for Vehicle 126
With and Without Redundancy
With Abort to LEO Capabilities

| Failure | Probability No Redundancy | One Engine-Out in Stage One Capability |
|---|---|---|
| Titan Stage One | | |
| Benign | | |
| Liquid Propulsion | 0.012 | 0 |
| Manifold | 0.003 | 0.003 |
| Other | 0.005 | 0.005 |
| Total Stage One | 0.020 | 0.008 |
| Titan Stage Two or Three Benign | 0.040 | 0.040 |
| Titan Stages, Catastrophic | 0.009 | 0.009 |
| Centaur Stage Total | 0.030 | 0.030 |
| To achieve mission orbit directly | 0.099 | 0.087 |
| Probability of achieving mission orbit utilizing the abort to orbit capability | 0.056 | 0.045 |
| Probability of Mission Failure | 0.043 | 0.042 |
| Expected number of launches | 23 | 24 |

The corresponding mission failure probabilities are 0.042 and 0.043.

Using the subsystem failure probabilities from Table 18, it can be seen that the total catastrophic failure probability of the vehicle (including the total failure probability of Centaur) is 0.039. Thus it can be seen that the effect of the Titan redundant stage vehicle capability to abort to LEO is to reduce the vehicle mission failure probability to very nearly that of its catastrophic failure probability. Given the above probabilities, the expected number of launches between mission failures including abort to LEO operations are 24 and 23 respectively, with and without redundancy. Thus, given an abort to orbit capability, there remains little incentive to reduce the benign failure probability of the vehicle. Also, accepting the complexities of the on-obit operations, a vehicle with abort to orbit capabilities can operate with mission failure probabilities comparable to a vehicle with a liquid redundant stage capability to achieve mission orbit. This is so because both vehicle capabilities serve to reduce the mission failure probabilities to values comparable to the vehicle catastrophic failure probabilities.

A launch vehicle utilizing modified Atlas II stages, instead of Titan stages in the configuration of vehicle 126 would have similar payload performance and failure probabilities.

Figure 8A:
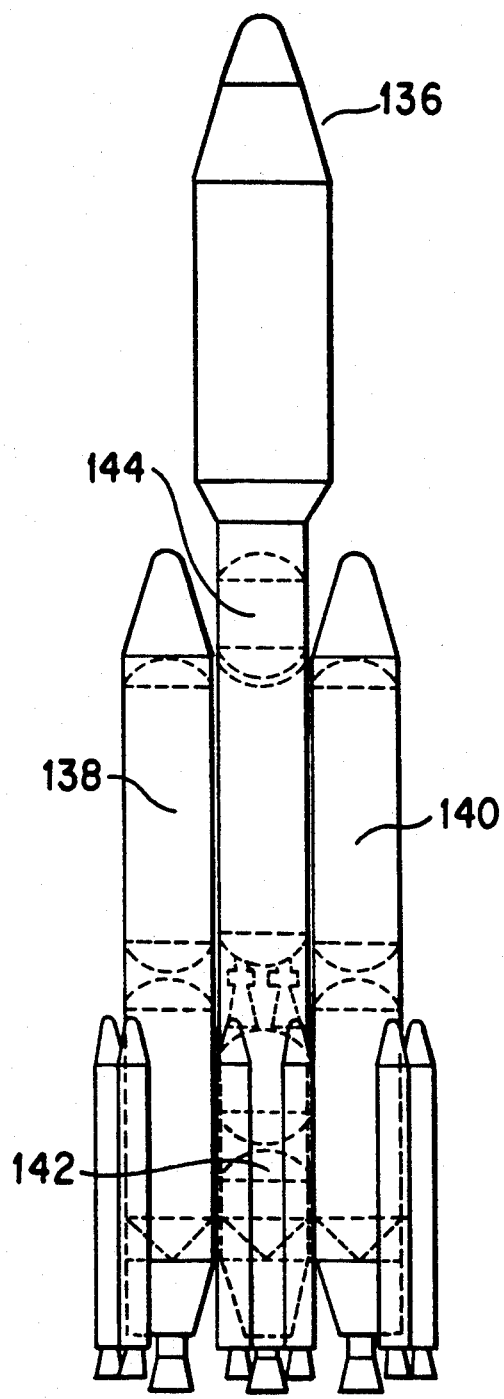
FIGS. 8(a) and 8(b) are a side view and a top view, respectively, of another alternate embodiment of the improved launch vehicle of the present invention.
Figure 8B:
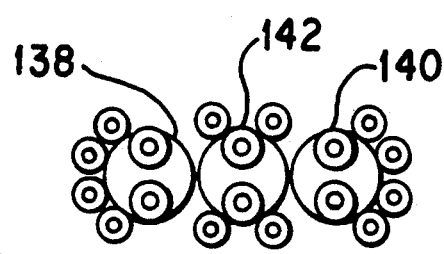

Another preferred embodiment of the current invention would be to add clusters of monolithic solid rocket motors to vehicle 126 with the objectives of 1) increasing its performance and 2) extending its abort capabilities to a redundant stage capability for mission success. FIGS. 8 (a) and (b) illustrate a side and top view of such a vehicle 136. Each of the Titan liquid stages, one 138, two 140 and three 142 have four GEM solid rocket motors attached. Stage four 144 is a modified Centaur stage similar to that for vehicle 126. The GEM motors are currently being used on the existing Delta II launch vehicle. Each GEM motor has an Isp of 264 sec and a thrust of 113,000 lbf. Eight of the GEM motors are ignited at liftoff. The remaining four participate in the second burn, after the first eight burn out and are staged. The vehicle 136 is sized so that the mission orbit will be attained with any Titan liquid stage failing to thrust at liftoff. Additionally, the vehicle 136 may be utilized with a less conservative failure strategy of one-engine out at liftoff in the core stage three 142. Weight and performance data are shown in Tables 19 and 20 for the vehicle 136 utilizing the two failure strategies.

Launch vehicle mission failure probability projections for vehicle 136 would differ from those for vehicle 64 only due to differences in failure probabilities of the solid rocket motors. Failure probability projections for small monolithic solid rocket motors are best predicted from solid castor motor flight history on the Delta launch vehicle family. The failure ratio for the castor motors is 0.0006. Thus, with twelve motors per flight, the projected failure probability would be approximately 0.007. Comparing this with the failure probability projection for the SRMU boosters on vehicle 64 yields a difference of 0.01−0.007=0.003. All other failure probability projections are the same for the two vehicles. Accordingly, the values shown for vehicle 64 in Table 10 are applicable to vehicle 136, since the differences for the SRM boosters are small as compared to the uncertainties in the projections for the totals.

Modified Atlas II stages could be used instead of Titan stages in the vehicle 136 configuration. Such a vehicle would have similar payload performances and mission failure probabilities to that of vehicle 136. Modified Delta II stages utilized in the vehicle 136 configuration would yield a vehicle with lower performance and mission failure probabilities than those projected for vehicle 136.

TABLE 19

Vehicle 136 Weight and Performance Data
With the Core Titan Stage Failed At Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 61.16 | 61.2 | 209440 | 18584 | 814970 | 904000 | 264.0 | 3424.242 |
| 2 | 61.2 | 61.16 | 122.3 | 104720 | 9292 | 407485 | 452000 | 264.0 | 1712.121 |
| 3 | 0.0 | 126.58 | 126.6 | 463000 | 25440 | 904926 | 1103568 | 301.7 | 3657.832 |
| 4 | 126.6 | 194.38 | 321.0 | 355500 | 33133 | 452463 | 551784 | 301.7 | 1828.916 |
| 5 | 321.0 | 514.12 | 835.1 | 76000 | 10153 | 68000 | 68000 | 460.0 | 147.826 |

Gross Weight at Liftoff    1322793 lb

TABLE 19-continued

Vehicle 136 Weight and Performance Data
With the Core Titan Stage Failed At Liftoff Payload Weight
GEO 10146
GTO 20679
LEO 41601

TABLE 20

Vehicle 136 Weight and Performance Data
With One Engine Failed in Titan Core Stage At Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 61.16 | 61.2 | 209440 | 18584 | 814970 | 904000 | 264.0 | 3424.242 |
| 2 | 61.2 | 61.16 | 122.3 | 104720 | 9292 | 407485 | 452000 | 264.0 | 1712.121 |
| 3 | 0.0 | 122.33 | 122.3 | 559319 | 25440 | 1131157 | 1379460 | 301.7 | 4572.290 |
| 4 | 122.3 | 55.29 | 177.6 | 151681 | 25440 | 678694 | 827676 | 301.7 | 2743.374 |
| 5 | 177.6 | 117.56 | 295.2 | 107500 | 7693 | 226231 | 275892 | 301.7 | 914.458 |
| 6 | 295.2 | 514.12 | 809.3 | 76000 | 10153 | 68000 | 68000 | 460.0 | 147.826 |

Gross Weight at Liftoff 1324877 lb
Payload Weight
GEO 13454
GTO 25700
LEO 50025

Launch vehicles having the configuration of vehicle 112 without an upper stage can be configured utilizing modified Titan and Atlas II liquid stages. For example, the vehicle 64 configuration could be changed by removing the Centaur upper stage 76 and re-sizing the Titan liquid stages 70, 72 and 74 so that they are more nearly optimum for LEO launches.

Figure 9A:
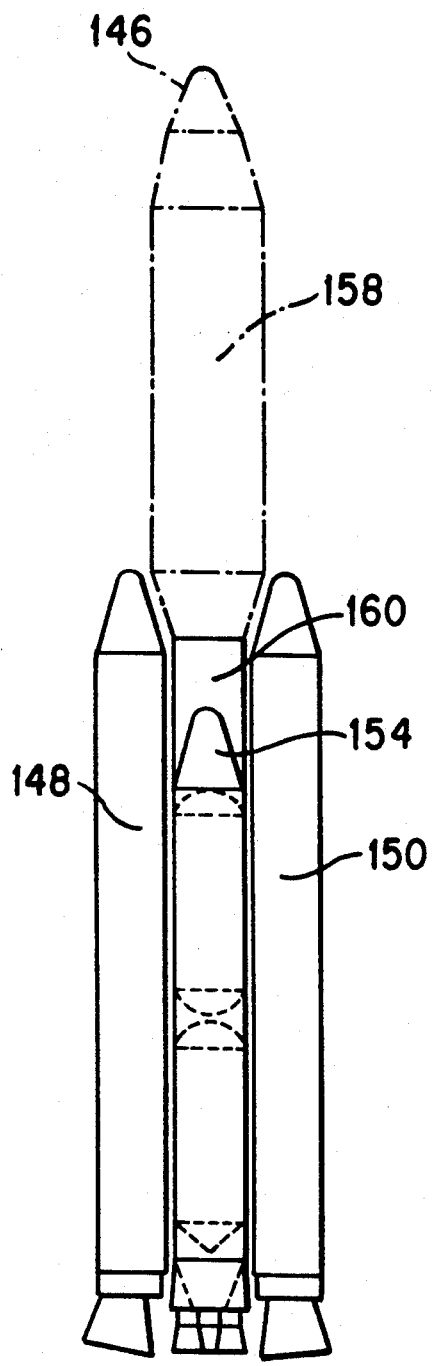
FIGS. 9(a) and 9(b) are a side view and a top view, respectively, of another alternate embodiment of the improved launch vehicle of the present invention.
Figure 9B:
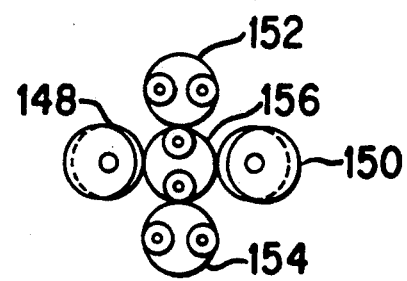

FIGS. 9(a) and 9(b) illustrate a side and top view of a preferred embodiment launch vehicle 146 designed for LEO missions, using modified Titan stages. The first stage consists of two SRMUs 148 and 150. The second stage consists of two Titan stages 152 and 154, with the third stage being a single Titan stage 156, the payload fairing 158 could house either 1) a LEO payload or 2) a payload with its upper stage for a higher energy orbit mission, or 3) a combination of the two. A cylindrical structure 160 supports the payload and fairing 158 on stage three 156 at the proper height above the stage one SRMUs 148 and 150.

Vehicle 146 weight and performance data are shown in Table 21 for the case of one engine failed in stage three 156 at liftoff.

The projected probability of mission failure for this vehicle can be obtained from Table 10. The probability differs from vehicle 64 in that the failure probability of the modified Centaur is removed. Thus, with one engine-out capability, the failure probability and expected number of launches between failures would be 0.044 and 23 respectively. Alternatively, the same vehicle could be launched with the more conservative redundant stage strategy, i.e., stage three 156 failed at liftoff. Weight and performance data for this case are shown in Table 22. Launching in this mode the vehicle would have less payload capability than that shown in Table 21. Correspondingly, it would have a lower mission failure probability which can be obtained from Table 10. Without the Centaur upper stage and with a redundant stage capability, the mission failure probability and expected number of launches between failures would be 0.019 and 53 respectively.

Figures 10A, 10B:
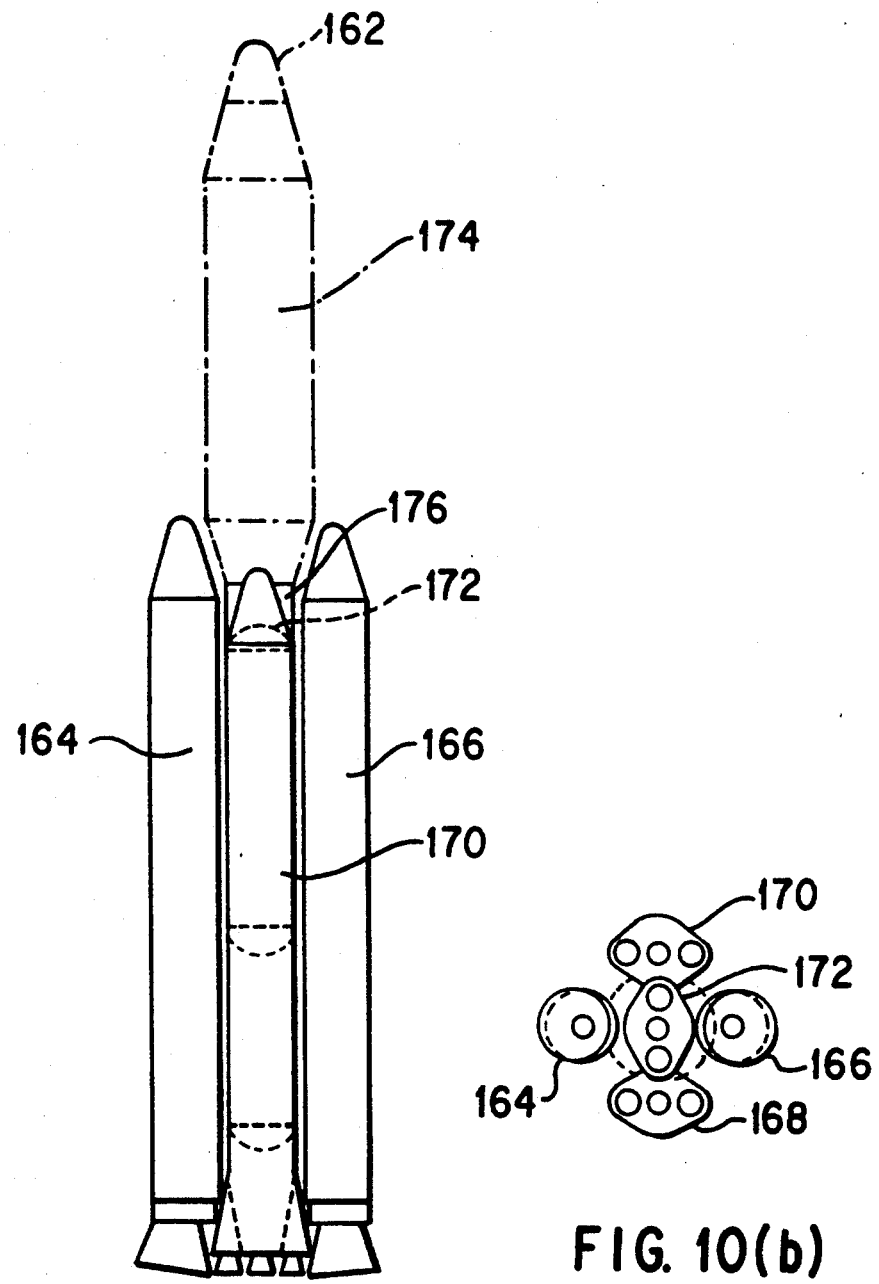
FIGS. 10(a) and 10(b) are a side view and a top view, respectively, of another alternate embodiment of the improved launch vehicle of the present invention.

FIGS. 10(a) and 10(b) illustrate a side and top view of a preferred embodiment launch vehicle 162 designed for LEO missions, using modified Atlas stages.

TABLE 21

Titan Vehicle 146 Weight and Peformance Data
One Engine Failed in Stage Three at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.79 | 115.8 | 529404 | 0 | 1131157 | 1379460 | 301.7 | 4572.290 |
| 3 | 115.8 | 102.9 | 218.7 | 470596 | 65465 | 1131157 | 1379460 | 301.7 | 4572.290 |
| 4 | 218.7 | 328.1 | 546.8 | 300000 | 26736 | 226231 | 275892 | 301.7 | 914.458 |

Gross Weight At Liftoff 2976000 lb.
Payload Weight
LEO
(Apogee) 71500
(Circular) 68600

TABLE 22

Titan Vehicle 146 Weight and Performance Data
Stage Three Failed at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.79 | 115.8 | 423516 | 0 | 904926 | 1103568 | 301.7 | 3657.832 |
| 3 | 115.8 | 1.00 | 116.8 | 3658 | 20779 | 904926 | 1103568 | 301.7 | 3657.832 |
| 4 | 116.8 | 283.13 | 399.9 | 517826 | 45827 | 452463 | 551784 | 301.7 | 1828.916 |

Gross Weight At Liftoff 2571000 lb.
Payload Weight
LEO
(Transfer) 56000
(Circular) 53200

The launch vehicle is comprised of two SRMUs 164 and 166 for the first stage, two modified Atlas stages 168 and 170 for the second stage and a single Atlas stage 172 for the third stage. The payload and payload fairing 174 are supported by a cylindrical structure 176 mounted on stage three 172 at the proper height above the stage one SRMUs 164 and 166.

Vehicle 162 weight and performance data are shown in Tables 23 for the case on one booster engine failed in stage three 172 at liftoff.

The projected probability of mission failure for this vehicle can be obtained from Table 13. The probability differs from the Atlas vehicle 64 in that the failure probability of the modified Centaur is removed. Thus, with one engine-out capability, the failure probability and expected number of launches between failures would be 0.048 and 21 respectively. Alternatively, the same vehicle could be launched with the more conservative redundant stage strategy, i.e., stage three 172 failed at liftoff. Weight and performance data for this case are shown in Table 24. launching in this mode the vehicle would have less payload capability than that shown in Table 23. Correspondingly, it would have a lower mission failure probability which can be obtained from Table 13. Without the Centaur upper stage and with a redundant stage capability, the mission failure probability and expected number of launches between failures would be 0.024 and 42 respectively.

Accordingly, the present invention provides an improved launch vehicle which; 1) circumvents the high altitude upper wind loads limitations of current expendable launch vehicles, 2) yields higher performance; 3) permits employment of engine-out and redundant stage capabilities to achieve increased reliability by aborting to LEO or achieving the mission orbit in spite of the failure. It will be appreciated that the present invention has only been illustrated by the above described embodiments and many other specific configurations may be provided while remaining within the scope of the present invention. Also, the foregoing estimated advantages in reliability and performance are not exhaustive of the features and advantages of the present invention and are merely illustrative thereof.

TABLE 23

Atlas Vehicle 162 Weight and Performance Data
With One Booster Engine Failed in
Stage Three at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 620782 | 0 | 1410316 | 1579839 | 294.7 | 5361.590 |
| 3 | 115.8 | 64.20 | 180.0 | 344718 | 63656 | 1410316 | 1579839 | 294.7 | 5369.378 |
| 4 | 180.0 | 412.28 | 592.3 | 483000 | 38367 | 311012 | 348397 | 297.7 | 1171.531 |

Gross Weight At Liftoff 3128000 lb.
Payload Weight
LEO
(Transfer) 63300
(Circular) 60400

TABLE 24

Atlas Vehicle 162 Weight and Performance Data
With Stage Three Failed at Liftoff

| BURN NO. | TIME START | (SEC) BURN TIME | END OF BURN TOTAL | WEIGHT (LBS) PROPELLANT BURNED | BURNOUT STAGED | THRUST (LBF) SEA LEVEL | VACUUM | VACUUM SPECIFIC IMPULSE (SEC) | FUEL FLOW RATE LB/SEC |
|---|---|---|---|---|---|---|---|---|---|
| 1 | 0.0 | 115.78 | 115.8 | 1370262 | 147902 | 2771600 | 3380000 | 285.6 | 11834.734 |
| 2 | 0.0 | 115.78 | 115.8 | 458279 | 0 | 1099304 | 1231442 | 293.8 | 4191.272 |
| 3 | 115.8 | 1.12 | 116.9 | 4691 | 22897 | 1099304 | 1231442 | 293.8 | 4191.272 |
| 4 | 116.9 | 263.32 | 380.2 | 552829 | 50497 | 549652 | 615721 | 293.8 | 2099.434 |

Gross Weight At Liftoff 2700000 lb.
Payload Weight

TABLE 24-continued

Atlas Vehicle 162 Weight and Performance Data
With Stage Three Failed at Liftoff LEO
(Transfer)    52600
(Circular)    49800

What is claimed is:

1. A launch vehicle comprising:
   a first stage including at least one solid rocket motor;
   a second stage having first propellant tanks and a first liquid propellant burning rocket engine;
   a third stage, configured so as to burn in parallel with said first and second stages, having a second propellant tank and a second liquid propellant burning rocket engine;
   means for transferring liquid propellant between said second stage and said third stage; and
   means for reconfiguring the liquid propellant transferring means in response to detection of a non-nominal condition in the form of a benign failure condition in said second or third stage.

2. A launch vehicle as set out in claim 1, wherein said first stage comprises two solid rocket motors, each having a sea level thrust of approximately 1,385,800 pounds force at liftoff.

3. A launch vehicle as set out in claim 1, wherein said second and third stages have approximately the same thrust at sea level at liftoff.

4. A launch vehicle as set out in claim 3, wherein each of said second and third stages have a total sea level thrust of approximately 452,000 pounds force at liftoff.

5. A launch vehicle as set out in claim 4, wherein said fourth stage has a thrust of approximately 68,000 pounds force.

6. A launch vehicle as set out in claim 3, wherein each of said second and third stages have a sea level thrust of approximately 549,000 pounds force at liftoff.

7. A launch vehicle as set out in claim 1, wherein said third stage is substantially the same length as said second stage.

8. A launch vehicle as set out in claim 1, wherein said third stage is shorter in length than said second stage.

9. A launch vehicle comprising:
   a first stage including at least one solid rocket motor;
   a second stage having first and second separate liquid propellant rocket motors, each having propellant tanks and a liquid propellant burning rocket engine;
   a third stage, configured so as to burn in parallel with said first and second stages, having a propellant tank and a liquid propellant burning rocket engine;
   means for transferring liquid propellant between said second stage and said third stage, said transferring means being reconfigurable in response to the detection of a non-nominal condition in the form of a benign failure in said second or third stage; and
   a fourth stage, configured so as to burn in series with said third stage, said fourth stage including a payload;
   wherein said first stage and said first and second liquid propellant rocket motors of said second stage are configured in parallel about said third stage and are separately releasably coupled to said third stage.

10. A launch vehicle as set out in claim 9, wherein each of said solid rocket motors has a sea level thrust of approximately 1,385,800 pounds force at liftoff.

11. A launch vehicle as set out in claim 9, wherein said first and second liquid propellant rocket motors and said third stage each have approximately 452,000 pounds force of thrust at liftoff at sea level.

12. A launch vehicle as set out in claim 9, wherein said first and second liquid propellant rocket motors of said second stage, and said third stage, each have a sea level thrust of approximately 549,000 pounds force at liftoff.

13. A launch vehicle comprising:
   a first stage including at least one solid rocket motor;
   a second stage having first and second separate liquid propellant rocket motors, each having propellant tanks and a liquid propellant burning rocket engine;
   a third stage, configured so as to burn in parallel with said first and second stages, having a propellant tank and a liquid propellant burning rocket engine;
   means for transferring liquid propellant between said second stage and said third stage; and
   a fourth stage, configured so as to burn in series with said third stage, said fourth stage including a payload;
   wherein said first stage and said first and second liquid propellant rocket motors of said second stage are configured in parallel about said third stage and are separately releasably coupled to said third stage; and
   wherein said means for transferring propellant comprises a first propellant manifold structure coupling the propellant tanks of said first liquid propellant rocket motor and said third stage and a second propellant manifold structure coupling the propellant tanks of said second liquid propellant rocket motor with said third stage.

14. A launch vehicle as set out in claim 13, wherein said first propellant manifold structure and said second propellant manifold structure each comprises:
   second stage outlet valves coupled to the propellant tank of the second stage;
   first and second manifold valves coupled between said second stage propellant tank and said third stage;
   releasing means, coupled between said first manifold valves and said second manifold valves, for separating portions of said first and second propellant manifold structure attached to said second stage from portions attached to said third stage during a staging of said second stage.

15. A launch vehicle as set out in claim 14, wherein said second stage propellant tanks and said third stage propellant tanks each comprise a fuel tank and an oxidizer tank, and wherein said second stage outlet valves comprise fuel tank outlet valves and oxidizer outlet valves.

16. A launch vehicle as set out in claim 14, wherein said means for transferring propellant further comprises first rocket motor engine inlet valves, second rocket motor engine inlet valves, and third stage rocket engine inlet valves.

17. A launch vehicle comprising:

a first stage including at least one solid rocket motor;

a second stage having first liquid propellant tanks and a first liquid propellant burning rocket engine;

a third stage, configured so as to burn in parallel with said first and second stages, having a second propellant tank and a second liquid propellant burning rocket engine;

means for transferring liquid propellant between said second stage and said third stage; and means for reconfiguring the propellant transfer between said second and third stages in response to a signal indicating detection of a non-nominal benign failure condition in said second or third stage.

18. A launch vehicle as set out in claim 17, wherein the signal is provided by ground based flight telemetry monitoring personnel.

19. A launch vehicle as set out in claim 17, wherein the means for reconfiguring comprises a plurality of electro-mechanical valves responsive to said signal.

20. A launch vehicle as set out in claim 17, wherein said means for reconfiguring, reconfigures propellant flow to said liquid burning rocket engines such that said second and third stages are operated as a single stage.

21. A method for controlling the in flight operation of a launch vehicle, the launch vehicle having a first stage including at least one solid rocket motor, a second stage having first liquid propellant tanks and a first liquid propellant burning rocket engine, a third stage configured so as to burn in parallel with said first and second stages having a second propellant tank and a second liquid propellant burning rocket engine, means for transferring liquid propellant between said second stage and said third stage, said means for transferring having a plurality of electro-mechanical valves, comprising the steps of:

monitoring in flight telemetry of the launch vehicle;

in response to detecting a failure in one of said second or third stages, re-configuring the transfer of propellant between the second and third stages by activating said plurality of valves in a predetermined sequence so as to burn propellant from said failed stage in the functioning of said second and third stages.

22. A launch vehicle comprising:

a first stage including at least one solid rocket motor;

a second stage having first and second separate liquid propellant rocket motors, each having propellant tanks and a liquid propellant burning rocket engine;

a third stage, configured so as to burn in parallel with said first and second stages, having a propellant tank and a liquid propellant burning rocket engine; and means for transferring liquid propellant between said second stage and said third stage, said transferring means being reconfigurable in response to the detection of a non-nominal condition in the form of a benign failure in said second or third stage;

wherein said first stage and said first and second liquid propellant rocket motors of said second stage are configured in parallel about said third stage and are separately releasably coupled to said third stage.

23. A launch vehicle as set out in claim 22, wherein each of said solid rocket motors has a sea level thrust of approximately 1,386,000 pounds force at liftoff.

24. A launch vehicle as set out in claim 22, wherein said first and second liquid propellant rocket motors and said third stage each have approximately 452,000 pounds force of force at liftoff at sea level.

25. A launch vehicle as set out in claim 22, wherein said first and second liquid propellant rocket motors of said second stage, and said third stage, each have a sea level thrust of approximately 549,000 pounds force at liftoff.

26. A multistage launch vehicle having a nominal launch staging and including:

a plurality of liquid rocket stages, each of said stages having propellant tanks and at least one liquid propellant burning rocket engine;

means for transferring propellant between stages; and means for reconfiguring the launch vehicle staging in real time in response to a signal indicating a non-nominal condition in the form of a benign failure condition in one of the stages, whereby the projected failure probabilities of the launch vehicle are substantially reduced.

27. A multistage launch vehicle having a nominal launch configuration and including:

a plurality of liquid rocket stages, each of said stages having propellant tanks and at least one liquid propellant burning rocket engine; and an interstage propellant transfer manifold for transferring propellant between stages and for reconfiguring the launch vehicle in real time in response to detection of a non-nominal condition in the form of a benign failure condition in one of the stages, whereby the projected failure probabilities of the launch vehicle are substantially reduced.

28. A multistage launch vehicle having a nominal launch configuration, said vehicle including:

a plurality of liquid rocket stages, each of said stages having propellant tanks and at least one liquid propellant burning rocket engine;

an interstage propellant transfer manifold; and means for reconfiguring in real time the interstage propellant transfer manifold and hence the launch vehicle in response to detection of a non-nominal condition in the form of a benign failure condition in one of the stages, whereby the projected failure probabilities of the vehicle are substantially reduced.

* * * * *